(12) United States Patent
Shamai et al.

(10) Patent No.: US 12,380,440 B2
(45) Date of Patent: Aug. 5, 2025

(54) UPDATING DIGITAL ASSETS TRANSACTIONS IN ISOLATED DEVICES

(71) Applicant: Galaxy Digital Trading LLC, New York, NY (US)

(72) Inventors: Shahar Shamai, Rehovot (IL); Lior Lamesh, Rishon-LeZion (IL)

(73) Assignee: Galaxy Digital Trading LLC, New York, NY (US)

( * ) Notice: Subject to any disclaimer, the term of this patent is extended or adjusted under 35 U.S.C. 154(b) by 313 days.

(21) Appl. No.: 17/908,570

(22) PCT Filed: Mar. 3, 2021

(86) PCT No.: PCT/IL2021/050237
§ 371 (c)(1),
(2) Date: Sep. 1, 2022

(87) PCT Pub. No.: WO2021/176453
PCT Pub. Date: Sep. 10, 2021

(65) Prior Publication Data
US 2023/0342762 A1    Oct. 26, 2023

Related U.S. Application Data

(60) Provisional application No. 62/984,822, filed on Mar. 4, 2020.

(51) Int. Cl.
*G06Q 20/38* (2012.01)
*G06Q 20/02* (2012.01)
(Continued)

(52) U.S. Cl.
CPC ......... *G06Q 20/3827* (2013.01); *G06Q 20/02* (2013.01); *G06Q 20/0655* (2013.01); *G06Q 20/223* (2013.01)

(58) Field of Classification Search
CPC .............. G06Q 20/3827; G06Q 20/02; G06Q 20/0655; G06Q 20/223; G06Q 20/065;
(Continued)

(56) References Cited

U.S. PATENT DOCUMENTS 9,225,695 B1   12/2015   Riera et al.
9,537,833 B2   1/2017    Zatko et al.
(Continued)

FOREIGN PATENT DOCUMENTS

EP    331775    1/2017
EP    3317775   1/2017
(Continued)

OTHER PUBLICATIONS

International Preliminary Report on Patentability Dated Jun. 17, 2021 From the International Bureau of WIPO Re. Application No. PCT/IL2019/051330. (9 Pages).
(Continued)

*Primary Examiner* — Patrick McAtee
*Assistant Examiner* — Karlyannie M. Garcia

(57) ABSTRACT

Described herein are methods and devices for updating digital assets transactions in an isolated device, comprising the isolated device (1) receiving limited length string(s) indicating a value of digital assets transferred from one or more other devices to an account associated with the isolated device in one or more transactions each recorded in a blockchain with a respective identifier computed based on input value(s) of the respective transaction which corresponds to output value(s) of previous transaction(s) which the isolated device is informed of and are stored in a predefined order in a depository allocated for the isolated device in the other device(s), (2) inferring the respective identifier of each transaction according to the output value(s) of the previous transaction(s) identified based on the trans- (Continued)

ferred value according to the predefined order and, (3) updating the isolated device with a digital assets balance of the associated account according to the transaction(s).

19 Claims, 14 Drawing Sheets

(51) Int. Cl.
*G06Q 20/06* (2012.01)
*G06Q 20/22* (2012.01)

(58) Field of Classification Search
CPC ........... G06Q 2220/00; G06Q 20/3672; G06Q 20/3678; G06Q 20/38215; G06Q 20/401; G06Q 20/405; G06F 21/64; H04L 9/085; H04L 9/3255; H04L 9/50; H04L 9/3239
See application file for complete search history.

(56) References Cited

U.S. PATENT DOCUMENTS

| | | | |
|---|---|---|---|
| 9,892,460 | B1 | 2/2018 | Winklevoss et al. |
| 2006/0041934 | A1 | 2/2006 | Hetzler |
| 2006/0242423 | A1 | 10/2006 | Kussmaul |
| 2014/0282938 | A1 | 9/2014 | Moisa |
| 2014/0351586 | A1 | 11/2014 | Hook et al. |
| 2015/0295720 | A1 | 10/2015 | Buldas et al. |
| 2015/0324789 | A1 | 11/2015 | Dvorak et al. |
| 2016/0342977 | A1 | 11/2016 | Lam |
| 2016/0365978 | A1* | 12/2016 | Ganesan ............ G06F 16/2255 |
| 2017/0085555 | A1 | 3/2017 | Bisikalo et al. |
| 2017/0109735 | A1 | 4/2017 | Sheng et al. |
| 2017/0232300 | A1 | 8/2017 | Tran et al. |
| 2017/0236121 | A1* | 8/2017 | Lyons .................... G06Q 20/06 705/71 |
| 2019/0052454 | A1 | 2/2019 | Wright et al. |
| 2019/0208260 | A1* | 7/2019 | Gratton .............. H04N 21/4227 |
| 2019/0318356 | A1 | 10/2019 | Martin et al. |
| 2019/0332691 | A1 | 10/2019 | Beadles et al. |
| 2019/0356484 | A1 | 11/2019 | Ettensohn et al. |
| 2020/0134606 | A1 | 4/2020 | Todd et al. |
| 2020/0304505 | A1* | 9/2020 | Shen .................... G06F 16/2246 |
| 2020/0356989 | A1 | 11/2020 | Shamai et al. |
| 2021/0049591 | A1 | 2/2021 | Lamesh |
| 2021/0083872 | A1* | 3/2021 | Desmarais ............ H04L 9/0825 |
| 2021/0099311 | A1* | 4/2021 | Saponaro .............. H04L 9/3297 |
| 2022/0021521 | A1 | 1/2022 | Shamai et al. |

FOREIGN PATENT DOCUMENTS

| | | |
|---|---|---|
| EP | 3259724 | 12/2017 |
| WO | WO 2018/020389 | 2/2018 |
| WO | WO 2019/159172 | 8/2019 |
| WO | WO 2020/115748 | 6/2020 |
| WO | WO 2020/225814 | 11/2020 |
| WO | WO 2021/176453 | 9/2021 |

OTHER PUBLICATIONS

International Preliminary Report on Patentability Dated Aug. 27, 2020 From the International Bureau of WIPO Re. Application No. PCT/IL2019/050181. (8 Pages).
International Search Report and the Written Opinion Dated Jun. 3, 2020 From the International Searching Authority Re. Application No. PCT/IL2020/050496. (29 Pages).
International Search Report and the Written Opinion Dated Jun. 19, 2019 From the International Searching Authority Re. Application No. PCT/IL2019/050181. (13 Pages).
International Search Report and the Written Opinion Dated Mar. 24, 2020 From the International Searching Authority Re. Application No. PCT/IL2019/051330. (14 Pages).
International Search Report and the Written Opinion Dated May 27, 2021 From the International Searching Authority Re. Application No. PCT/IL2021/050237. (12 Pages).
Invitation to Pay Additional Fees and Communication Relating to the Results of the Partial International Search Dated May 19, 2019 From the International Searching Authority Re. Application No. PCT/IL2019/050181. (4 Pages).
Official Action Dated Jun. 23, 2021 From the US Patent and Trademark Office Re. U.S. Appl. No. 16/404,843. (22 Pages).
Search Report and Written Opinion Dated Nov. 3, 2021 From the Intellectual Property Office of Singapore, IPOS Re. Application No. 11202007263V. (12 Pages).
Supplementary European Search Report and the European Search Opinion Dated Oct. 6, 2021 From the European Patent Office R. Application No. 19754487.7. (9 Pages).
Armory Technologies "Armory FAQ", Armory Technologies, XP055845074, p. 1-7, 2016.
Armory Technologies "Best Bitcoin Wallet Armory I Multi-Signature Cold Storage", Armory Technologies, XP055845060, p. 1-3, Feb. 3, 2016.
Bitcoin Stack Exchange "How to Sign a Transaction Using Only an Offline Computer?", Bitcoin Stack Exchange, XP055845053, p. 1-3, Feb. 8, 2014.
BitFinex "BitFinex Down Due to Bitcoin Security Breach—120k BTC Stolen", Hacker News, 14P., Aug. 2, 2016.
Coinkite "Announcing: Coldcard™. The World Needs an Open, Cheap & Ultrasecure Hardware Wallet!", Coinkite Blog, XP055845066, p. 1-5, Dec. 2017.
Nakamoto "Bitcoin: A Peer-to-Peer Electronic Cash System", Bitcoin White Paper, Retrieved From the Internet, Oct. 31, 2008.
Voegtlin "Multising Wallets", Electrum Read the Docs, XP055771867, p. 1-5, Mar. 29, 2017.

\* cited by examiner

UPDATING DIGITAL ASSETS TRANSACTIONS IN ISOLATED DEVICES

RELATED APPLICATIONS

This application is a National Phase of PCT Patent Application No. PCT/IL2021/050237 having International filing date of Mar. 3, 2021, which claims the benefit of priority under 35 USC § 119 (e) of U.S. Provisional Patent Application No. 62/984,822 filed on Mar. 4, 2020.

PCT Patent Application No. PCT/IL2021/050237 is also related to PCT Patent Application No. PCT/IL2019/051330 titled "Secure Consensus over a Limited Connection", filed on Dec. 5, 2019 and PCT Patent Application No. PCT/IL2019/050181 titled "Cryptocurrency Wallet and Cryptocurrency Account Management", filed on Feb. 14, 2019.

The contents of the above applications are all incorporated by reference as if fully set forth herein in their entirety.

FIELD AND BACKGROUND OF THE INVENTION

The present invention, in some embodiments thereof, updating digital assets transactions in digital assets storage devices, and, more specifically, but not exclusively, to updating digital assets transactions in isolated digital assets storage devices isolated from the network.

In the modern era financial transactions have long past been mainly done using digitally based transaction instructions for transferring fiat (real) money thus replacing the traditional actual money transactions.

In recent years the introduction of blockchain based cryptocurrencies has paved the way for further usage of digital currency, in fact virtual currency that is not regulated by any one single entity, such as states, central banks and/or the like.

While presenting many advantages, using the digital currencies, specifically the cryptocurrencies may present major security concerns since digital assets specifically the cryptocurrencies are regulated by vast computer networks which are inherently prone to malicious attacks. The trade using the digital assets essentially requires network connection which further exposes the electronic devices (digital wallets) storing the user accounts to such malicious attacks launched by malicious parties in attempt to gain control over the digital assets stored in these accounts.

SUMMARY OF THE INVENTION

According to a first aspect of the present invention there is provided a method of updating received digital assets transactions in an isolated device, comprising using one or more processors of an isolated device having no network connectivity for:

Receiving one or more limited length strings indicating a value of digital assets transferred in one or more transactions from one or more other devices to an account associated with the isolated device. Each of the one or more transactions is recorded in a blockchain maintained by a plurality of networked computing nodes with a respective identifier computed based on one or more input value of digital assets included in the respective transaction which corresponds to a respective output value of one or more previous transactions stored in a predefined order in a depository allocated for the isolated device in the other device(s). The isolated device is informed of each previous transaction stored in the depository.

Inferring the respective identifier of each of the transactions according to the one or more output values of one or more previous transactions identified based on the transferred value according to the predefined order.

Updating the isolated device with a balance of digital assets of the associated account according to the one or more transactions including their respective identifiers.

According to a second aspect of the present invention there is provided an isolated device for storing digital assets, comprising a limited capacity interface configured to receive one or more limited length strings, a storage medium string a code and one or more processors coupled to the limited capacity interface and to the storage medium. The one or more processors execute the code. The code comprising:

Code instructions to receive one or more limited length strings indicating a value of digital assets transferred in one or more transactions from one or more other devices to an account associated with the isolated device. Each of the one or more transaction is recorded in a blockchain maintained by a plurality of networked computing nodes with a respective identifier computed based on one or more input values of digital assets included in respective transaction which correspond to respective output value(s) of one or more previous transactions stored in a predefined order in a depository allocated for the isolated device in the other device(s). The isolated device is informed of each previous transaction stored in the depository.

Code instructions to inferring the respective identifier of each transaction according to the one or more output values of one or more previous transactions identified based on the transferred value according to the predefined order.

Code instructions to update the isolated device with a balance of digital assets of the associated account in according to the one or more transactions including their respective identifiers.

In a further implementation form of the first and/or second aspects, the digital assets comprise cryptocurrency and the isolated device is a cryptocurrency wallet.

In an optional implementation form of the first and/or second aspects, the other device(s) allocates a plurality of depositories each for a respective one of a plurality of isolated devices.

In a further implementation form of the first and/or second aspects, the one or more limited length strings are received by the isolated device via one or more limited capacity interfaces of the isolated device configured to receive one or more limited length strings.

In a further implementation form of the first and/or second aspects, the other device(s) is networked and aware of each transaction of digital assets on the blockchain network. The other device(s) is a member of a group consisting of: a network connected device and one or more of the plurality of networked computing nodes.

In a further implementation form of the first and/or second aspects, the other device(s) is implemented by a subset of the plurality of networked computing nodes using one or more Multi-Party Computation (MPC) protocols to maintain the depository and carry out the transaction.

In a further implementation form of the first and/or second aspects, the respective identifier is a hash value computed using one or more hash functions.

In an optional implementation of the first and/or second aspects, the value transferred to the other device(s) in each of the one or more previous transactions is indexed in the output of the respective one or more previous transactions with a predefined index used by the isolated device to infer the respective identifier of the one or more transactions.

In an optional implementation of the first and/or second aspects, a respective predefined value is assigned for each additional parameter potentially affecting the respective identifier computed for the one or more transactions.

In a further implementation form of the first and/or second aspects, the isolated device is informed of each previous transaction stored in the depository via one or more limited length strings received by the isolated device thus the isolated device is informed of the one or more previous transactions stored in the depository.

In a further implementation form of the first and/or second aspects, each previous transaction stored in the depository relates to a respective transaction previously transferred from the isolated device to the other device(s) thus the isolated device is informed of the one or more previous transactions stored in the depository.

In a further implementation form of the first and/or second aspects, the predefined order is based on a time of transfer of each previous transaction.

In a further implementation form of the first and/or second aspects, the isolated device infers the respective identifier of each of the one or more transactions based on the transferred value and one or more input of one or more most recent previous transaction which was most recently transferred from the isolated device to the other device(s) such that a cumulative value of digital assets transferred in the one or more most recent previous transactions is at least equal to the transferred value.

In a further implementation form of the first and/or second aspects, in case the cumulative value exceeds the transferred value, the other device(s) transfers an excess transaction to itself which comprises the difference between the cumulative value and the transferred value. The excess transaction is stored in the depository as the transaction most recently transferred from the isolated device to the other device(s).

In an optional implementation of the first and/or second aspects, the other device(s) transfers a second value of digital assets from an account associated with the isolated device to one or more third devices. The other device(s) transfers the second value from one or more least recent previous transactions which was least recently transferred from the isolated device to the other device(s). A second cumulative value of digital assets transferred in the one or more least recent transactions is at least equal to the second value.

In an optional implementation of the first and/or second aspects, the other device(s) transfers the second value to the one or more third device via another depository allocated in the other device(s) for one or more third devices.

In an optional implementation of the first and/or second aspects, in case the value of the one or more outputs of the one or more least recent previous transactions is significantly larger than the second value, the other device(s) creates one or more hierarchical split levels for one or more of the least recent previous transactions. Each hierarchical split level comprises a predefined number of artificial sub-transactions each having the identifier of the one or more least recent previous transaction and associated with a predefined sub-value such that a sum of the sub-value of all sub-transactions of a certain split level equals the value of a next higher hierarchy transaction. The other device(s) transfers at least part of the second value from one or more of the sub-transactions.

In an optional implementation of the first and/or second aspects, in case a commission is allocated to one or more of the plurality of computing nodes for recording one or more of the transactions, the isolated device is informed of a commission value to enable the isolated device to correctly identify the one or more previous transactions having a cumulative sum exceeding the transferred sum after the value of the commission is deducted from the cumulative sum.

In a further implementation form of the first and/or second aspects, the commission value is predefined thus the isolated device is informed of the value of the commission.

In a further implementation form of the first and/or second aspects, the isolated device is informed of the commission value via one or more limited length strings received by the isolated device.

In a further implementation form of the first and/or second aspects, the commission value is adjusted in a predefined manner compared to a commission value of one or more previous transactions transferred from the other device(s) to the isolated device.

In a further implementation form of the first and/or second aspects, the commission value is predefined for the one or more transactions which is recorded in the blockchain by one or more of the plurality of computing nodes which receives a second commission value for recording the one or more transactions.

In an optional implementation of the first and/or second aspects, the second commission value is allocated for one or more subsequent transactions succeeding one or more of the transactions such that the commission and the second commission are transferred to the one or more computing node which records in the blockchain both the one or more transactions and the one or more subsequent transactions.

In a further implementation form of the first and/or second aspects, the other device(s) delivers the second commission directly to the one or more computing nodes which record in the blockchain both the one or more transactions.

In a further implementation form of the first and/or second aspects, in case the respective identifier is further based on a signature generated by the other device(s), the isolated device is further configured to derive the signature from a unique private key assigned to the other device(s) and available to the isolated device in order to infer the respective identifier according to the to the one or more output values of the one or more previous transactions identified based on the transferred value according to the predefined order and the signature generated by the other device(s).

In an optional implementation of the first and/or second aspects, the isolated device is further configured to infer the respective identifier based on the signature according to one or more malleability parameters of the signature indicated by the one or more limited length strings received by the isolated device.

In a further implementation form of the first and/or second aspects, in case the respective identifier is further based on a random value selected by the other device(s). The isolated device is further configured to derive the random value in order to infer the respective identifier based on based on the one or more output values of the one or more previous transactions identified according to the transferred value with respect to predefined order, the signature and the random value.

In a further implementation form of the first and/or second aspects, the isolated device derives the random value from a plurality of random values securely transmitted previously by the isolated device via a unidirectional secured channel of the isolated device to the other device(s).

In a further implementation form of the first and/or second aspects, the isolated device derives the random value from a random seed transferred previously from the isolated device to the other device(s) via a unidirectional secured channel of the isolated device.

In a further implementation form of the first and/or second aspects, the isolated device derives the random value from the one or more limited length strings indicating a predefined random value used by the other device(s) to create the respective identifier.

In an optional implementation of the first and/or second aspects, in case the other device(s) comprises a subset of computing nodes of the plurality of computing nodes, the isolated device infers the respective identifier according to the private key of the subset of computing nodes which participated in transferring the one or more transactions. The subset of computing nodes is indicated by the one or more limited length strings.

In an optional implementation of the first and/or second aspects, the isolated device is further configured to create in advance a plurality of valid transactions for a predefined number of hierarchical split levels using the private key of the other device(s) and transmit the plurality of valid transactions to the other device(s) which updates the depository accordingly.

In an optional implementation of the first and/or second aspects, in case the other device(s) comprises multiple computing nodes of the plurality of computing nodes. The isolated device splits each of the plurality of valid transactions to a plurality of partial valid transactions using one or more secret sharing algorithms and transmits plurality of partial valid transactions to the multiple computing nodes.

In a further implementation form of the first and/or second aspects, the other device(s) transfers a second value of digital assets from an account associated with the isolated device to one or more third devices by transferring one or more least recent valid transactions of the plurality of valid transactions selected according to the second value.

In an optional implementation of the first and/or second aspects, the isolated device is further configured to receive the one or more transactions by creating in advance a valid transaction according to the transferred value indicated by the one or more limited length strings and transmit the valid transaction to the one or more other device which updates the depository accordingly. The other device(s) transfers the transferred value to the isolated device in the one or more transactions which is based on the valid transaction. The isolated device infers the respective identifier of each of the one or more transactions based on the valid transaction.

In an optional implementation of the first and/or second aspects, the isolated device is further configured to create a plurality of valid transactions for a predefined number of hierarchical split levels using the private key of the other device(s) for one or more excess transactions transferred from the other device(s) to itself comprising a difference between the transferred value and a cumulative value of digital assets of one or more outputs of one or more most recent transactions of the plurality of valid transactions stored in the depository.

In an optional implementation of the first and/or second aspects, the isolated device is further configured to receive the one or more transactions by creating in advance a plurality of valid transactions for a plurality of predefined values of digital assets according to a predefined number of hierarchical split levels and transmit the plurality of valid transactions to the other device(s) which updates the depository accordingly. The other device(s) transfers the transferred value to the isolated device by transferring the one or more transactions selected from the plurality of valid transactions according to the transferred value.

In an optional implementation of the first and/or second aspects, the isolated device is further configured to receive the one or more transactions by creating a plurality of valid transactions for a plurality of predefined values of digital assets according to a predefined number of hierarchical split levels and transmit the plurality of valid transactions to the other device(s) which updates a plurality of depositories allocated for the isolated device in the other device(s) such that each of the plurality of valid transactions is stored in a respective one of the plurality of depositories. The other device(s) transfers the transferred value to the isolated device by transferring the one or more least transaction from one or more of the plurality of depositories selected according to the transferred value.

In an optional implementation of the first and/or second aspects, the isolated device is further configured to receive the one or more transactions by creating in advance one or more valid predefined value transactions that comprises a plurality of output values each for a predefined limited value of digital assets and transmit the one or more valid predefined value transactions to the other device(s) which updates the depository accordingly. The other device(s) transfers the transferred value to the isolated device by transferring the one or more valid transactions selected from of the plurality of valid predefined value transactions according to the transferred value.

In an optional implementation of the first and/or second aspects, the isolated device is further configured to receive a plurality of transactions each from a respective one of a plurality of accounts of the other device, each of the plurality of accounts is associated with a different unique private key of a plurality of private keys which is deterministically derivable from another one of the plurality of private keys of another account used to create a succeeding transaction of the plurality of transactions, the isolated device is informed of the value transferred in each of the plurality of transactions and the private key of the account used to transfer the latest transaction of the plurality of transactions, the isolated device deterministically derives the private key of each of the plurality of private keys based on the private key of the account used for the succeeding transaction, the isolated device infers the respective identifier of each of the plurality of transactions by deriving the private key of each account used for each transaction to derive the respective signature used to compute the respective identifier.

In a further implementation form of the first and/or second aspects, each of the plurality of accounts used to create a respective transaction to the isolated device is emptied from all digital assets by creating a respective excess transaction to an account of the plurality of accounts used to create the succeeding transaction.

In a further implementation form of the first and/or second aspects, the isolated device having a unidirectional secured channel is first synchronized with all previous transactions made between its associated account and any other account prior to transmitting one or more transactions via its unidirectional secured channel. The synchronization comprises receiving one or more limited length strings indicative of all transactions related to the associated account which the isolated device was not informed of previously.

In an optional implementation of the first and/or second aspects, the isolated device is further configured to receive the one or more transactions from another isolated device disconnected from the blockchain network and thus potentially unaware of one or more previous transactions transferred from the isolated device to the another isolate device. Each of the one or more transactions is based on one or more of the previous transactions stored in the predefined order in the depository allocated for the isolated device in the another isolated device. The one or more limited length strings are indicative of each previous transaction transferred from the isolated device to the another isolated device that the another isolated device is aware of.

In an optional implementation of the first and/or second aspects, the isolated device is further configured to transfer one or more transactions to each of a first and second other isolated devices based on a plurality of previous transactions received from the two other isolated devices and stored in a single depository allocated for the two other isolate devices in the isolated device. The isolated device is configured to transfer:
One or more transactions to the first other isolated device based on one or more left-most previous transaction stored in the single depository.
One or more transaction to the second other isolated device base on one or more right-most previous transaction stored in the single depository.

In an optional implementation of the first and/or second aspects, the isolated device is further configured to transfer to itself a transaction which comprises a plurality of outputs each for a predefined value of digital assets, the isolated device transfers a respective value of digital assets to each of a plurality of other devices by transferring to each respective other device a transaction which comprises one or more inputs derived from one or more outputs of the plurality of outputs according to the respective value.

In an optional implementation of the first and/or second aspects, the isolated device is further configured to transfer to one or more of the plurality of other devices a plurality of transactions each comprising a respective one of a plurality of inputs derived from a subset of consecutive outputs of the plurality of outputs.

In an optional implementation of the first and/or second aspects, the isolated device is further configured to create a plurality of recursive transactions each comprising a plurality of outputs of predefined value of digital assets cumulatively equal to an output of a respective output of a previous iteration, the isolated device transfers a respective value of digital assets to one or more of the plurality of other devices by transferring to the other device(s) a transaction which comprises one or more inputs derived from one or more outputs of the plurality of outputs according to the respective value such that the other device(s) infers the recursion level according to the transferred value with respect to the predefined value of each output of each recursive transaction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
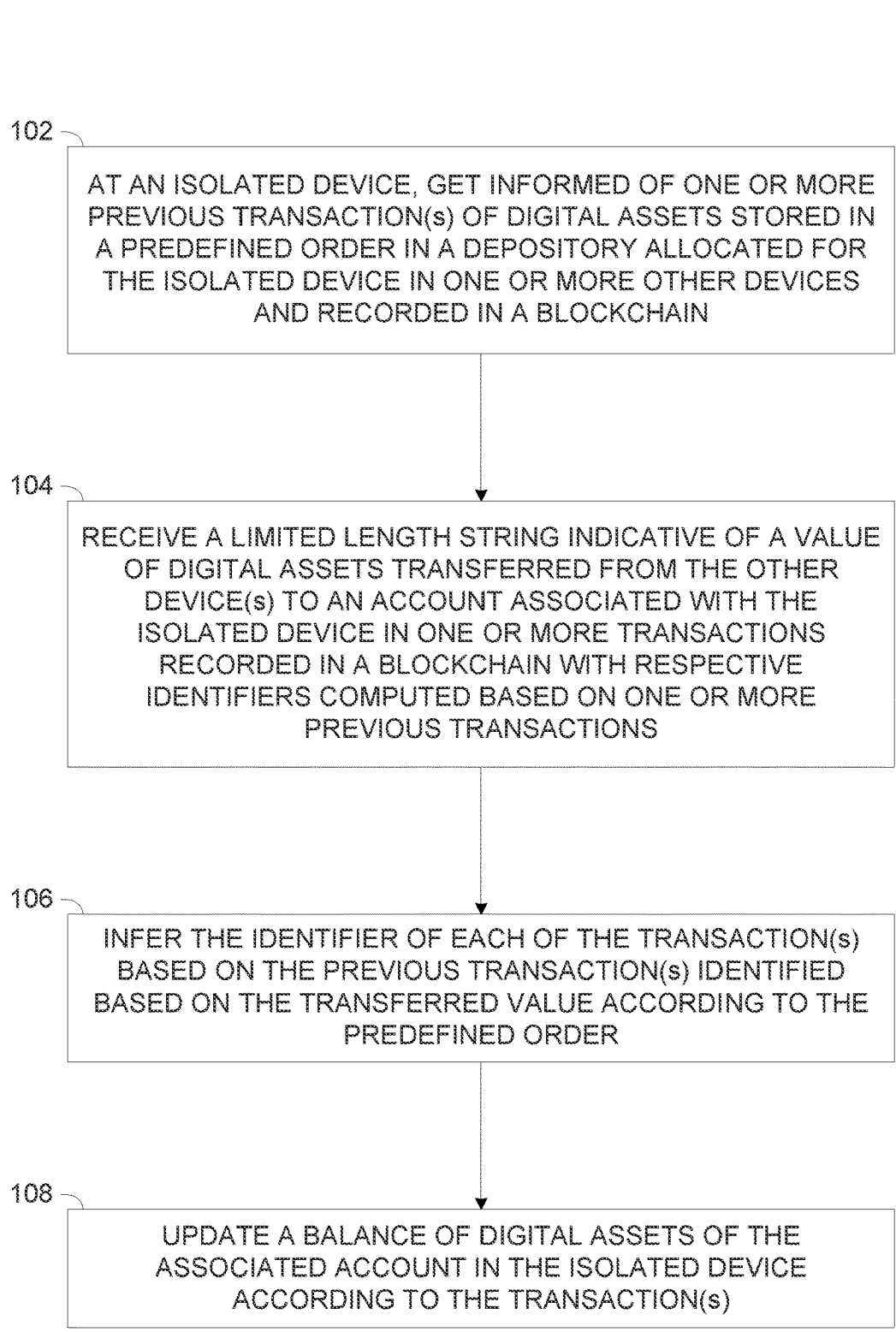
FIG. 1 is a flowchart of an exemplary process of updating a balance of digital assets in an isolated device according to transactions to an account associated with the isolated device recorded in a blockchain, according to some embodiments of the present invention.

The present invention, in some embodiments thereof, updating digital assets transactions in digital assets storage devices, and, more specifically, but not exclusively, to updating digital assets transactions in isolated digital assets storage devices isolated from the network.

According to some embodiments of the present invention, there are provided methods, systems, devices and computer program products for updating an isolated device used for storing digital assets of transactions made to an account associated with the isolated device serving as a digital, specifically a cold wallet.

In particular, the digital assets are regulated by a plurality of distributed networked computing nodes forming a community by maintaining a distributed ledger such as, for example, a blockchain such that each transaction of digital assets in the community network, for example, a blockchain network is recorded in the distributed ledger, specifically in the blockchain which is irreversible and immutable and thus immune to tampering to verify non-reproduction and irreversibility of the records recorded in the blockchain.

The digital assets may primarily refer to cryptocurrency, for example, Bitcoin, Bitcoin Cash, Ethereum and/or the like but may further include other forms of digital assets, for example, instructions for digital transactions of fiat money, shares (stocks) and/or the like. The limited value of the digital assets and the number of limited value accounts may set to support storage of practically any value (amount) of the digital assets in the plurality of limited value accounts.

As known in the art, each transaction of digital assets is recorded in the blockchain with a respective identifier, for example, a hash code (value) computed according to the relevant (used) digital assets protocol(s) based on the content of the transaction, for example, transferred value(s), input value(s), output value(s), one or more digital assets protocol parameters and/or the like. To maintain the irreversibility and immutability of the blockchain each transaction is derived from one or more previous transactions as known in the art.

Moreover, while some of the digital assets protocol(s), for example, Bitcoin (specifically Bitcoin segwit transactions) may not base the computation of the respective identifier on a unique signature of the originating device (account) other digital assets protocol(s) such as, for example, Bitcoin Cash may define that the respective identifier is further computed based on the unique signature. The respective identifier of each transaction may typically be a significantly long string, for example, 256 bits, 512 bits and/or the like.

The digital assets are typically stored in a digital wallet which may be accessible only to a user associated with an account of digital assets that is further associated with the digital wallet. As they may store large values of digital assets, the digital wallets may be highly susceptible to attacks initiated by malicious parties in order to gain control over the stored digital assets.

Therefore, as the isolated device may serve as the digital wallet, the isolated device is isolated from the network such that no network communication may infiltrate the isolated device making the isolated device immune to network based attacks. However, the isolated device may comprise a transmit only transmitter which may be used to establish a unidirectional secure channel with one or more of the computing nodes of the community and transmit data to them in a secure manner.

The isolated device may further include a very limited (data) capacity input interface disconnected and hence isolated from the network. The limited capacity input interface may be operated manually and/or automatically by one or more users authorized to access the isolated device. Operating the limited capacity input interface, the user may insert limited length strings to provide data to the isolated device.

Since the isolated device is disconnected from any network, and specifically from the blockchain network, the isolated device may not detect transactions made in the blockchain network and recorded accordingly in the blockchain. In particular, the isolated device may be unaware of transactions made to and/or from the account it is associated with. Therefore, while these transactions may be recorded in the blockchain the isolated device may not be informed of these transactions and may not be able to update its internal balance of the account accordingly.

As the limited capacity interface is the only input interface available to interact with the isolate device, updating and informing the isolated device of digital assets transactions, specifically transactions to and/or from the account associated with the isolated device must be done via the limited input interface. Such interaction of the user with the isolated device via the limited capacity interface, in particular for inserting the respective identifier if each transaction may be highly time consuming, tedious and/or prone to errors.

Therefore, in order to reduce and minimize the amount of data that needs to be inserted to the isolated device via the limited input interface, the isolated device may be configured to infer the transactions based on very limited information provided via the limited capacity interface, for example, the value of the transaction(s) and/or information relating to one or more previous transactions.

To this end, one or more other devices, specifically devices associated with accounts from which digital assets are transferred and/or predicted to be transferred to the account associated with the isolated device may be configured to allocate a depository for the isolated device. The depository may store one or more previous transactions which the isolated device is informed of and is thus aware of (familiar with). The isolated device may be informed of the previous transaction(s) using one or more methods as described in detail herein after. Moreover, the previous transactions may be stored in the depository in a predefined order which is also known to the isolated device.

The other device may transmit a transaction of a value of digital assets transferred to the account associated with the isolated device, and the transaction may be recorded in the blockchain with the respective identifier by the blockchain community network. In particular, the other device creates the transaction based on one or more of the previous transactions stored in the predefined order in the depository allocated for the isolated device.

The isolated device, disconnected from the network and is thus unaware of the transaction, may however infer the transaction and independently compute its respective identifier based on very limited information, for example, the transferred value. The isolated device may compute the respective identifier since the isolated device may determine, based on the transferred value and based on the predefined order, which of the previous transactions was used to create the transaction and may therefore determine the content of the transaction and may compute the respective identifier accordingly.

The isolated device may then update its local balance of its associated account according to the inferred transaction as recorded in the blockchain. Moreover, as the isolated device may be updated and synchronized with the blockchain with respect to the balance of digital assets in the associated account, one or more transactions may be transferred from isolated device to one or more other accounts.

According to some embodiments of the present invention, as described herein after in further detail, the other device may be a network connected device which may detect transactions transmitted in the blockchain network and recorded in the blockchain and/or the other device may be another isolated device disconnected from the network and may hence be unaware of one or more such transactions.

Furthermore, according to some embodiments of the present invention, as described herein after in further detail, there are provided methods and techniques for effectively utilizing the digital assets of previous transactions stored in the depository allocated for the isolated device in the other device.

Using the isolated device configured to infer the transactions based on very limited information received via its limited capacity interface may present major benefits and advantages compared to existing methods for storing digital assets, specifically cryptocurrency.

First, as the isolated device is disconnected and isolated from any network, the isolated device may be highly robust and fully immune to network based attacks. Moreover, the isolated device may be kept, placed and/or stored in a limited access location, for example, a safe, a guarded location, a monitored location and/or the like thus making the isolated device also immune to on premises attempts to compromise it.

Moreover, as the isolated device may infer the transactions and synchronize itself accordingly based on very limited information the effort for interacting with the isolated device to update it may be significantly reduced. In particular, since the interaction may be manual, significantly reducing the required input information may relief the user of prolonged, time intensive, tedious and error prone interaction processes for updating the isolated device as may be done by the existing methods.

Furthermore, effectively utilizing the digital assets of the previous transactions stored in the depository allocated for the isolated device in the other device may significantly reduce the frequency, duration and/or effort required for re-initializing the isolated device to inform the isolated device of the previous transactions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of updating a balance of digital assets in an isolated device according to transactions to an account associated with the isolated device recorded in a blockchain, according to some embodiments of the present invention.

An exemplary process 100 may be executed by an isolated device used for storing digital assets to update its internal balance of digital assets to reflect transactions of digital assets to isolated device from other devices associated with other accounts of private people, commercial entities (e.g. companies, organizations, etc.), institutions (e.g. government agencies, etc.) which are recorded (logged) in a distributed ledger such as, for example, a blockchain regulating the digital assets.

The blockchain may be maintained by blockchain network comprising a plurality of networked computing nodes communicating with each other using one or more secure consensus protocols employed to ensure that the blockchain is irreversible and immutable and thus immune to tampering to verify non-reproduction and irreversibility of the records recorded in the blockchain.

The isolated device may be therefore used as a wallet associated one or more accounts for storing such blockchain controlled digital assets, for example, a blockchain regulated cryptocurrency, such as for example, Bitcoin, Bitcoin Cash, Ethereum and/or the like. In another exemplary embodiment, the isolated device may be used to issue instructions for digital transactions of a fiat money (real currency) and as such, the instructions for the digital transactions which may be regarded as digital assets may be also regulated by a blockchain network maintaining a respective blockchain.

The isolated device however is isolated from any network, for example, the blockchain network such that the isolated device is highly robust and immune to network attacks initiated by malicious parties, specifically for compromising and/or gaining access and control over the digital assets stored in the isolated device.

The isolated device may include a unidirectional (one-way) secure connection for outputting (transmitting) data to one or more devices, in particular devices connected to the blockchain network comprising the computing nodes regulating the digital assets blockchain, for example, the cryptocurrency blockchain. The isolated device may further include a limited input interface used for receiving manually and/or automatically inserted limited data volumes, in particular limited length strings.

Being disconnected from the blockchain network, updating and informing the isolated device of digital assets transactions to and/or from the account associated with the isolated device must be done via the limited input interface.

Therefore, in order to reduce and minimize the amount of data that needs to be inserted to the isolated device via the limited input interface, the isolated device may be configured to infer the transactions to its associated account based on very limited information, for example, the value of the transaction(s) and information relating to previous transactions.

The isolated device may then update its local account with the balance of the digital assets as according to the inferred transactions as recorded in the blockchain. Moreover, as the isolated device may be updated and synchronized with the blockchain with respect to the balance of digital assets in the associated account, one or more transactions may be transferred from isolated device to one or more other devices.

Figure 2:
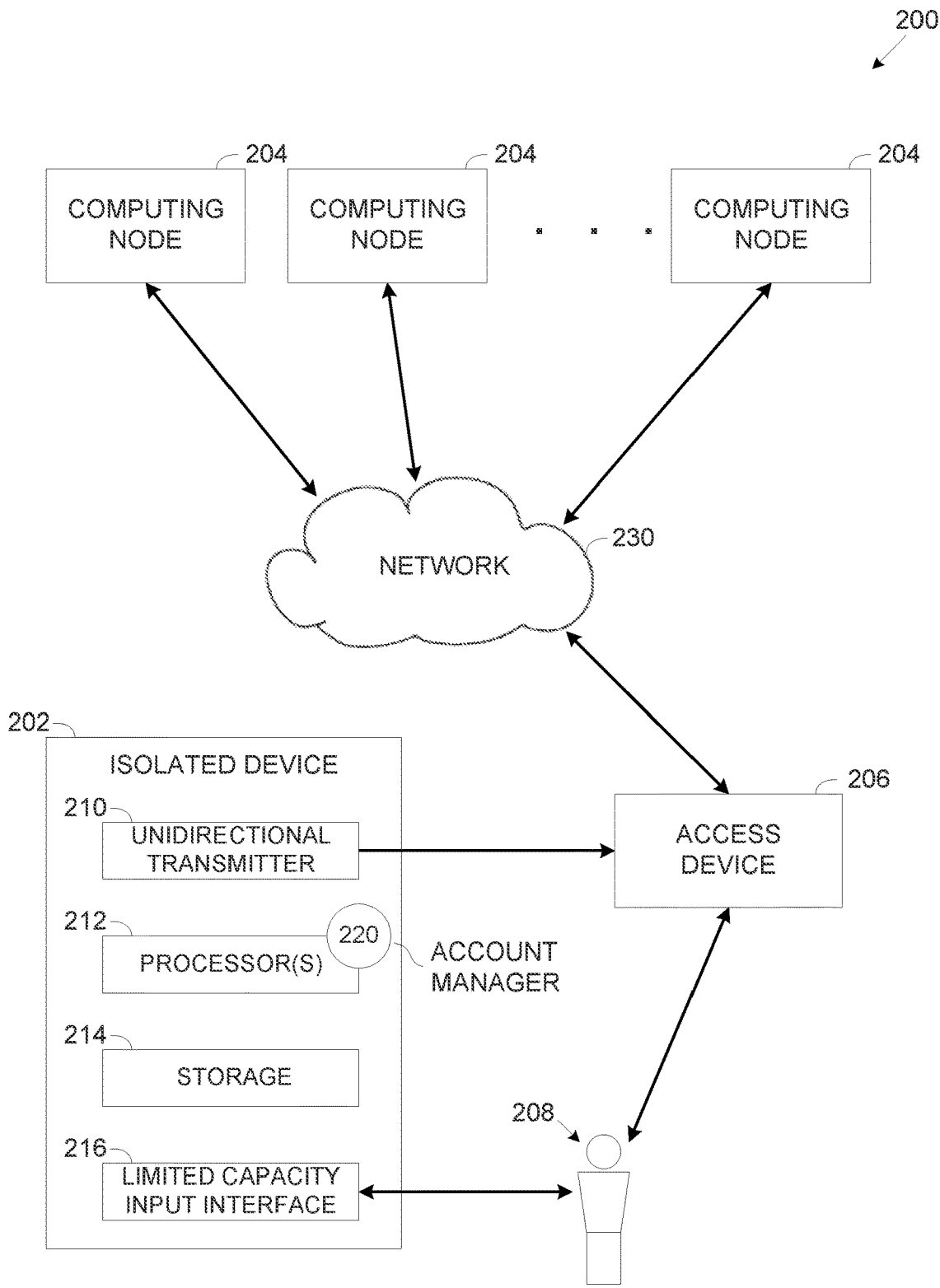
FIG. 2 is a schematic illustration of an exemplary system for updating a balance of digital assets in an isolated device according to transactions to an account associated with the isolated device recorded in a blockchain, according to some embodiments of the present invention.

Reference is also made to FIG. 2, which is a schematic illustration of an exemplary system for updating a balance of digital assets in an isolated device according to transactions to an account associated with the isolated device recorded in a blockchain, according to some embodiments of the present invention. An exemplary system 200 may include an isolated device 202 adapted to communicate with a community network comprising a plurality of computing nodes 204 regulating the digital assets, for example, a blockchain network maintaining a distributed ledger blockchain to track, log and record digital assets transactions, for example, cryptocurrency transactions.

The isolated device 202 may be associated with an account of digital assets and may be used for securely storing digital assets of the associated account. The isolated device 202 may execute the process 100 for updating its internal (local) balance of digital assets according to transactions of digital assets made to the associated account and recorded in the digital assets blockchain.

The computing nodes 204 may include for example, a computer, a server, a processing node, a network node, a cloud computing resource, a Smartphone, a tablet and/or the like capable of communicating with each other via a network 230 comprising one or more wired and/or wireless networks, for example, a Local Area Network (LAN), a Wireless LAN (WLAN), a Wide Area Network (WAN), a Municipal Area Network (MAN), a cellular network, the internet and/or the like.

The isolated device 202 may comprise a unidirectional transmitter 210 to facilitate a unidirectional (one-way) secure communication channel with one or more other devices, a processor(s) 212 for executing a process such as the process 100 and storage 214 for storing program code (i.e., program store) and/or data. The isolated device 202 may further include a secure limited capacity input interface 216 for receiving limited and typically very low volume data.

The isolated device 202 may be associated with a user 208. In particular, the isolated device 202 serving as a wallet for storing digital assets may be associated with one or more accounts of an individual (i.e. private person), a commercial entity (e.g. company, organization, etc.), an institution (e.g. government agency, etc.) and or the like. The user 208 typically an individual authorized to access an account of digital assets associated with the isolated device 202 which is used to securely store these digital assets of the associated account.

According to some embodiments of the present invention, specifically for the cryptocurrency blockchain applications, the isolated device 202 may facilitate a cold wallet associated with a cryptocurrency account accessible by the user 208 to store the cryptocurrency funds. As the cold wallet isolated device 202 is disconnected and thus isolated from the network 230, the cold wallet may be highly immune to network based malicious attacks directed to compromise the cold wallet in order to gain access and control of the account and possibly transfer cryptocurrency funds from the cold wallet.

The unidirectional transmitter 210 may include one or more wired, wireless and/or optical transmitting interfaces adapted for data transmittal only and thus unable to receive data. The unidirectional transmitter 210 may be physically tamper resistant such that compromising data transmitted from the unidirectional transmitter 210 is impossible and/or detectable and reported. Moreover, the unidirectional transmitter 210 may transmit encrypted data thus forming a reliable and secure unidirectional (one-way) communication channel. The unidirectional transmitter 210 may include for example, a light based (e.g. infrared, laser, etc.) transmitter configured for optically encoding data. In particular, the unidirectional transmitter 210 may transmit a directed light pattern directed to a specific receiver which may not be intercepted by potentially (eavesdropping) malicious devices. In another example, the unidirectional transmitter 210 may include a wired and/or wireless transmitter, for example, a serial transmitter, a Radio Frequency (RF) transmitter configured for transmitting data over wire and/or over the air. In another example, the unidirectional transmitter 210 may include a display, for example, a screen, a projector and/or the like for displaying a QR code encoding data which may be scanned and recovered for transmission to one or more of the computing nodes 204. In another example, the unidirectional secure communication channel may be implemented using a hardware storage media, for example, a CD-ROM disk and/or the like preferably a onetime use disposable disk. In such case, the unidirectional transmitter 210 may include a media access interface adapted for writing, burning and/or programming data to the hardware storage media. The burned hardware storage media may be then provided to the one or more of the computing nodes 204 thus securely transferring data from the isolated device 202 to the computing nodes 204.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute an account manager application 220 for executing the process 100. The account manager 220 may further utilize and/or facilitate one or more hardware elements integrated and/or coupled with the isolated device 202, for example, a circuit, a component, an Integrated Circuit (IC), an Application Specific Integrated Circuit (ASIC), a Field Programmable Gate Array (FPGA), a Digital Signals Processor (DSP) and/or the like. For example, the account manager 220 may use a random number generator for creating one or more encryption keys, for example, an asymmetric encryption key pair comprising a private key and a public key as known in the art. In another example, the account manager 220 may use a Hardware Security Module (HSM) to utilize one or more functions, for example, public key infrastructures (PKIs), message signing, key injection, database encryption and/or the like.

The limited capacity input interface 216 may be configured to receive limited and typically very low volume of data which may be manually and/or automatically inserted. For example, the limited capacity input interface 216 may include one or more user interfaces such as, for example, a keyboard, a touchscreen and/or the like for interacting with the user 208 to receive textual strings of data typed in by the associated user 208. In another example, the limited capacity input interface 216 may include a computer punched card reader configured to read data, for example, limited length strings encoded in one or more punched cards inserted manually and/or automatically to the computer punched card reader. The user interface may further include one or more output interfaces, for example, a display, a speaker, an earphone and/or the like for outputting data to the user 208.

Due to the nature and deployment of the computing nodes 204 which may be located in different geographical locations, the isolated device 202 may communicate with one or more of the computing nodes 204 via one or more access devices 206 connected to the network 230. The access device 206 may receive data from the isolated device 202 via the unidirectional secure communication channel facilitated by the unidirectional transmitter 210 and broadcast the received data to one or more of the computing nodes 204 over the network 230. For example, the access device 206 may include an optic receiver configured to receive optically encoded data transmitted by the light source unidirectional transmitter 210 of the isolated device 202. In another example, the access device 206 may include a wired and/or wireless receiver configured to receive data transmitted by the wired and/or wireless unidirectional transmitter 210 of the isolated device 202. In another example, the access device 206 may include a scanner configured to scan and recover data from a QR code generated and displayed by the display unidirectional transmitter 210 of the isolated device 202.

Moreover, the access device 206 may be facilitated, for example, by a computing node such as the computing nodes 204 which is part of the community network and is accessible to the user 208, for example, a Smartphone, a tablet, a computer, a server and/or the like. In another example, the access device 206 may include a networked device accessible to the user 208, for example, a Smartphone, a tablet, a laptop, a desktop, a smart watch, smart glasses and/or the like which is not part of the community network but capable of communicating with one or more of the computing nodes 204 via the network 230.

Optionally, the access device 206 serves as hot wallet, i.e. a network connected wallet and may be associated with the same account as the account associated with the isolated device 202 serving as the cold wallet and the same user 208 as the user 208 of the isolated device 202.

The access device 206 may be configured to present to the user 208 information received from the community network of computing nodes 204. For example, the access device 206 may present status information relating to the digital assets account stored by the isolated device 202. In another example, the access device 206 may present information relating to transactions made to and/or from the account associated with the isolated device 202. Moreover, the access device(s) 206 may present one or more limited length strings computed based on the account status information received from the community network. As such, specifically in case the isolated device 202 is the cold wallet storing the cryptocurrency account of the user 208, the access device 206 may be regarded as a hot wallet associated with the same account stored by the isolated device 202 and connected to the community network via the network 230.

The isolated device 202 may further establish a unidirectional secure communication channel with each of one or more of the network connected devices, for example, one or more of the computing nodes 204 over the unidirectional communication channel facilitated by the unidirectional transmitter 210. As such the isolated device 202 may transmit data to each of one or more of the computing nodes 204 such that only the respective (i.e., the target) computing node 204 node may be able to decipher the transmitted data. The isolated device 202 may use one or more methods, techniques and/or algorithms as known in the art to establish the unidirectional secure communication channel. For example, the isolated device may encode one or more messages directed to a certain computing node 204 using a public key of the certain computing node 204. As such, only the certain computing node 204 having a private key corresponding to the public key may decode the message(s). The isolated device 202 may therefore use the public keys of each of one or more of the computing nodes 204 to securely send them data.

As described herein before, the data transmitted by the isolated device 202 over the unidirectional secure communication channel facilitated by the unidirectional transmitter 210 may be encrypted. The encryption may be facilitated using one or more encryption schemes as known in the art, for example, symmetric encryption in which a single key and/or a key derivative may be used for both encryption and decryption, asymmetric encryption using encryption-decryption key pairs and/or the like.

In case of asymmetric encryption, for example, Rivest—Shamir—Adleman (RSA) public-key cryptosystem and/or the like encryption-decryption key pairs are uniquely associated with each of at least some of the computing nodes 204 which may use the keys to encrypt the data transmitted to one or more of the other computing nodes 204 thus establishing a unidirectional secure and reliable channel with each of the at least some computing nodes 204. The isolated device 202 may also be associated with such an encryption-decryption key pair to support verification of data received by the isolated device 202 and authentication of data transmitted from the isolated device 202. In particular, the encryption-decryption key pairs associated with the computing nodes 204 may include, for example, an asymmetric cryptographic key pair comprising a private key and a public key and/or the like. The public key of the asymmetric cryptographic key pair associated with each computing node as well as the isolated device 202 is publicly shared and thus serves as basis for the address of the respective device. For example, the address of each limited value account may be created by applying one or more hash functions to the public key thus generating a hash value serving as the address of the respective limited value account. The private key of the asymmetric cryptographic key pair associated with each computing node 204 as well as the private key of the isolated device 202 is kept secret and is only available to the respective device which, using its private key, is the only device capable of decrypting messages addressed to it.

In case of asymmetric encryption, for example, Advanced Encryption Standard (AES), Data Encryption Standard (DES) and/or the like a symmetric key, for example, a single key and/or a simple key derivative may be sued for both encryption and decryption at both ends, for example, by the isolated device 202 and one or more of the computing nodes 204 to establish the unidirectional secure and reliable channel with each of these computing nodes 204. The symmetric key may be shared between the isolated device 202 and the computing node(s) 204 using one or more methods, for example, using asymmetric encryption to exchange the symmetric key, manually inserting the symmetric key to the isolated device 202 and/or the like.

To facilitate the encrypted data transmission, the encryption (public) key of each of at least some of the computing nodes 204 must be available to the isolated device 202. Specifically, the isolated device 202 must obtain the encryption (public) key of the access device 206. These encryption key(s) of the computing nodes 204 and/or of the access device 206 may be provided to the isolated device 202 using one or more techniques. For example, the encryption key associated with one or more of the computing nodes 204 may be provided to the isolated device 202 through the limited capacity input interface 216, for example, as a limited length string inserted (typed in) by the user 208 and/or encoded in one or more punched cards inserted manually and/or automatically to the limited capacity input interface 216. Optionally, the encryption key associated with at least some of one or more of the computing nodes 204 is made available to the isolated device 202 using one or more trusted controllers as described in Provisional Patent Application No. 62/755,942 titled "Secure Consensus over a Limited Connection", filed on Dec. 6, 2018, the contents of which are incorporated herein by reference in their entirety.

The system 200 and the process 100 may be applied for transferring digital assets between the isolated device 202 and one or more other devices, for example, one or more of the computing nodes 204 associated with one or more other digital assets accounts, one or more networked devices associated with one or more other digital assets accounts and/or one or more other isolated devices such as the isolated device 202.

Figure 3A:
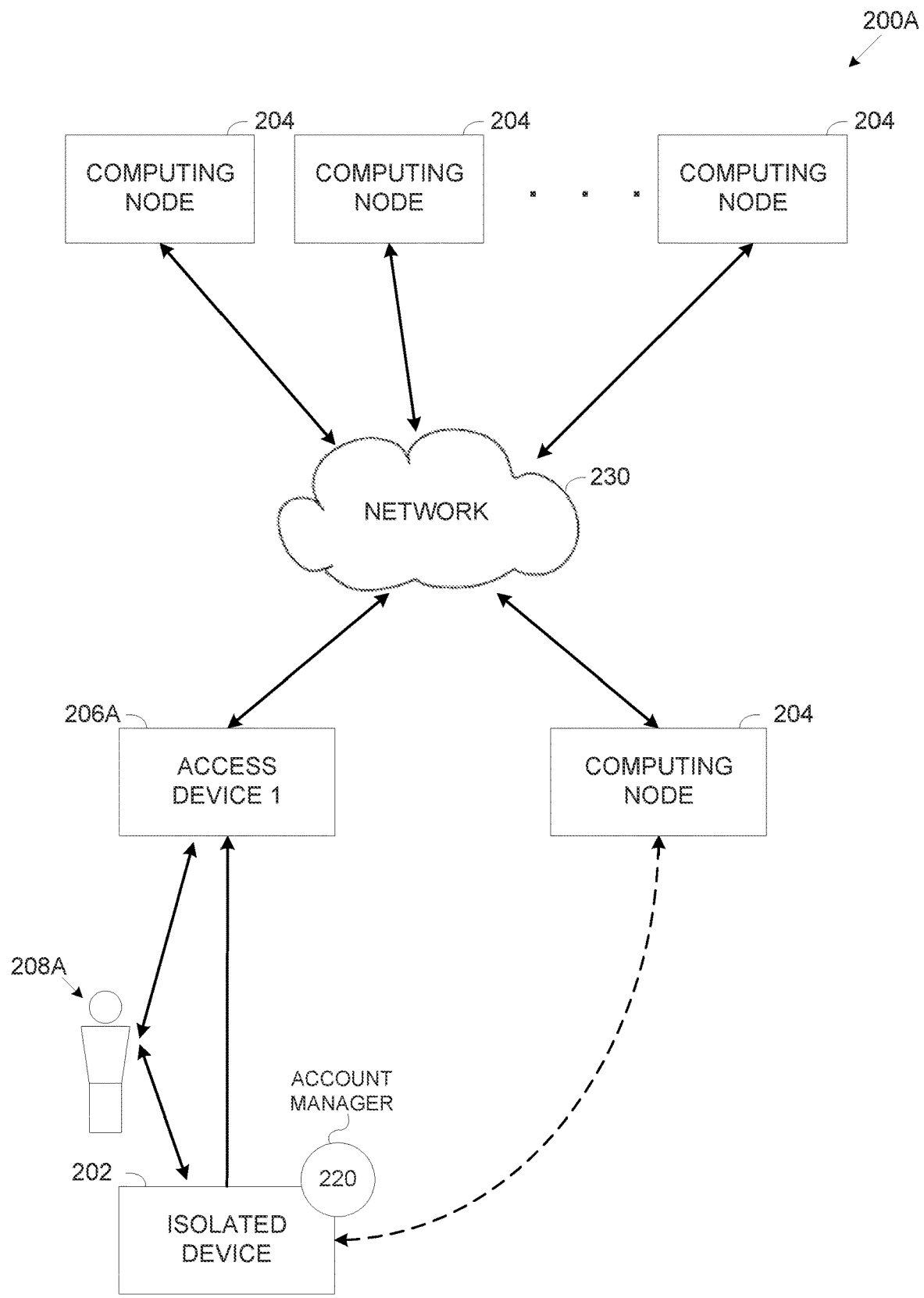
FIG. 3A, FIG. 3B and FIG. 3C are schematic illustration of exemplary embodiments of a system for updating a balance of digital assets in an isolated device according to transactions to an account associated with the isolated device recorded in a blockchain, according to some embodiments of the present invention.
Figure 3B:
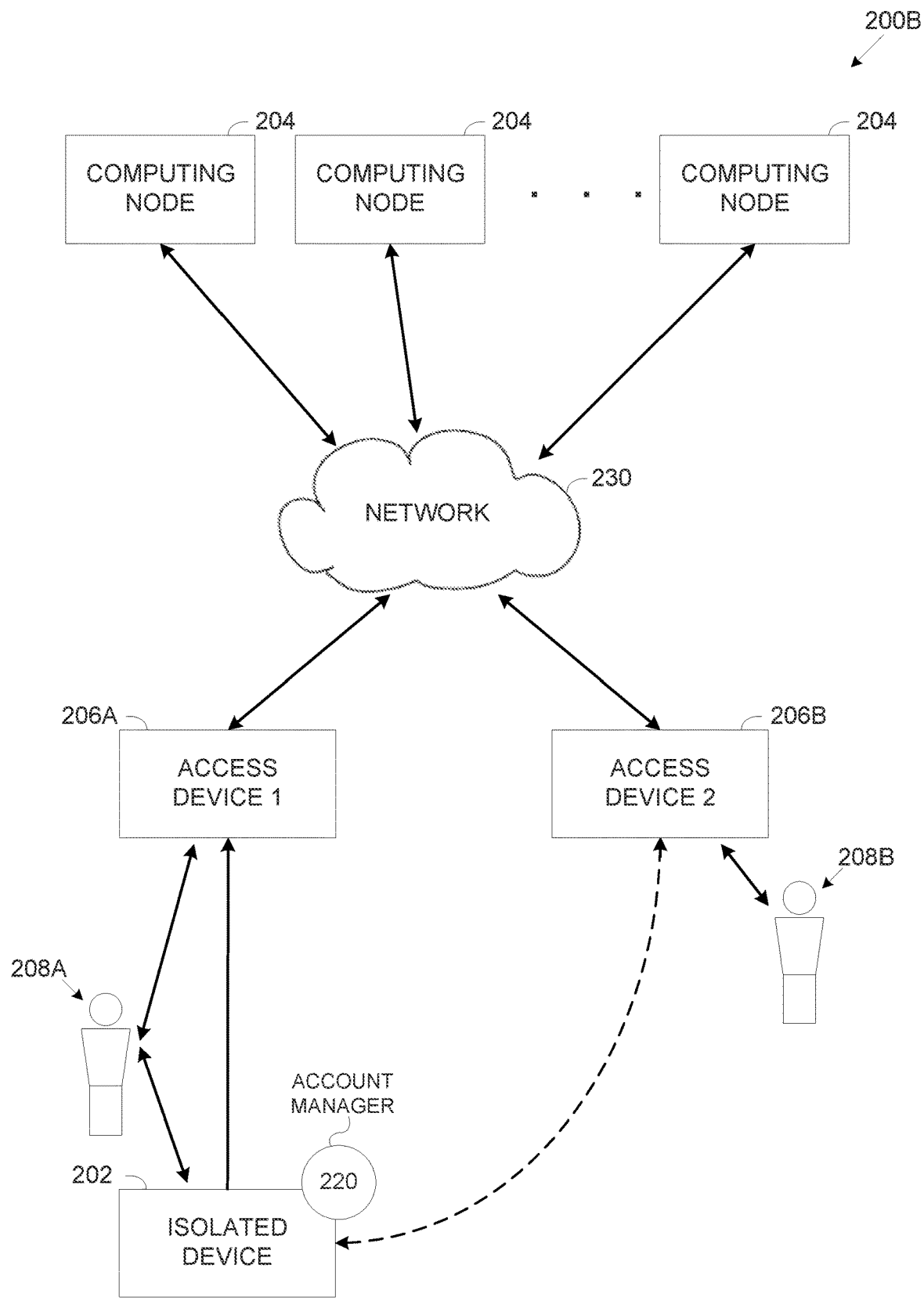
Figure 3C:
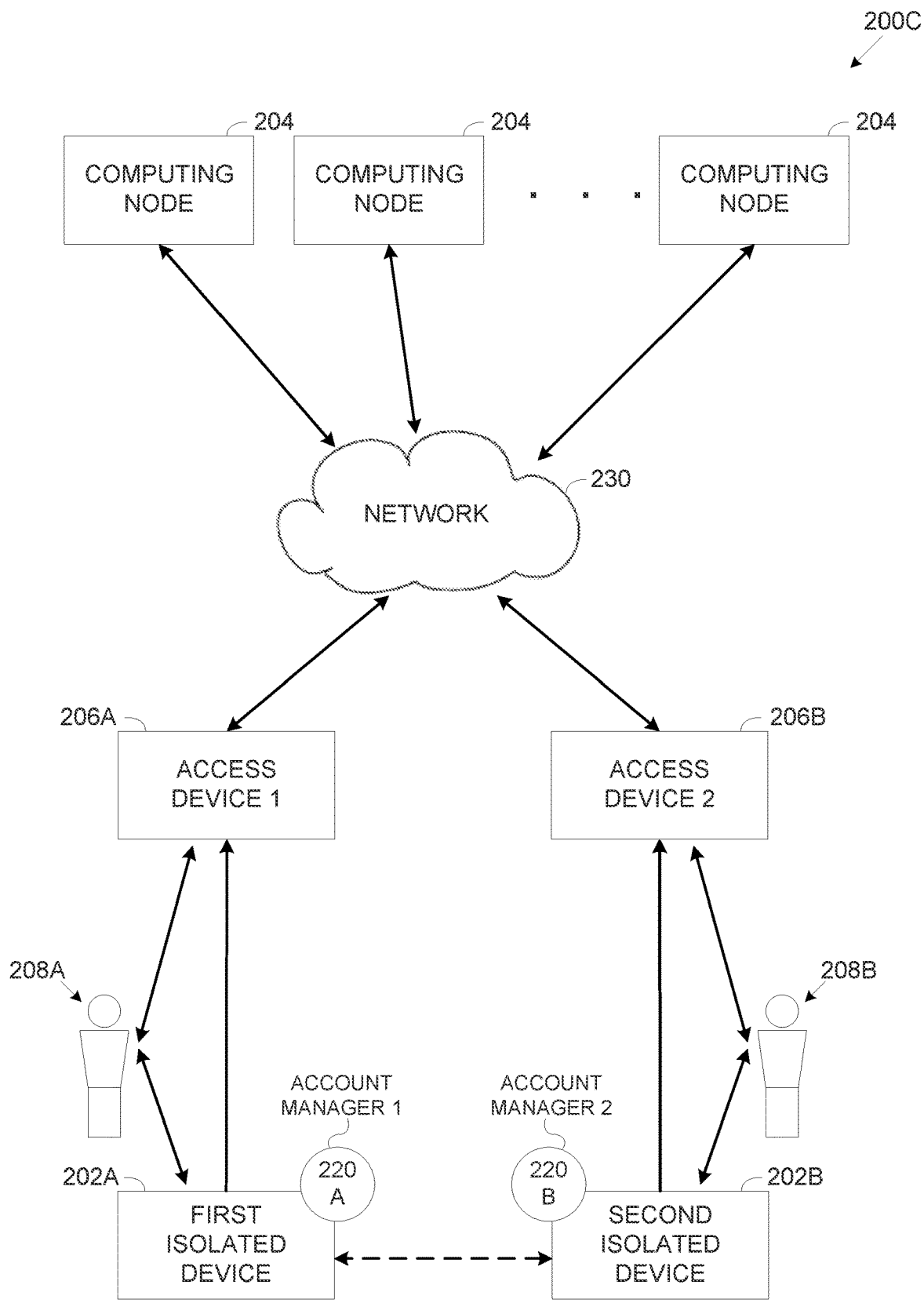

Reference is now made to FIG. 3A, FIG. 3B and FIG. 3C, which are schematic illustration of exemplary embodiments of a system for updating a balance of digital assets in an isolated device according to transactions to an account associated with the isolated device recorded in a blockchain, according to some embodiments of the present invention.

As shown in FIG. 3A, a system 200A such as the system 200, may include an isolated device such as the isolated device 202 accessible by a user 208A such as the user 208 and associated with an account of digital assets regulated by a plurality of computing nodes such as the computing nodes 204 communicating with each other via a network such as the network 230 using one or more secure consensus protocols to record transactions of digital assets in a blockchain, for example, the cryptocurrency blockchain. The isolated device 202, typically connected to the network 203 via an access device 206A such as the access device 206, may be configured and operated to transmit transactions to one or more of the computing nodes 204, in particular computing node(s) 204 associated with one or more other accounts of the digital assets. The isolated device 202 may be further configured and operated to update its local account with transactions received from one or more of the computing nodes 204. While the system 200A is described for the isolated device 202 interacting with a single computing node 204 to transmit/receive digital assets transactions, this should not be construed as limiting since the isolated device 202 may communicate with a plurality of such computing nodes 204 associated with multiple other accounts of the digital assets.

As shown in FIG. 3B, a system 200B such as the system 200, may include an isolated device 202 accessible by the user 208A and associated with an account of digital assets regulated by the plurality of computing nodes 204 communicating with each other via the network 230 using the secure consensus protocol(s). The isolated device 202 connected to the network 203 via the access device 206A may be configured and operated to transmit transactions to one or more other access devices 206B such as the access device 206. Specifically, the isolated device 202 may transmit one or more digital assets transactions to an access device 206B accessible by a user 208B such as the user 208 and associated with one or more other accounts of the digital assets and serving, for example, as hot wallets. The isolated device 202 may be further configured and operated to update its local account with transactions received from one or more of the other access devices 206B. While the system 200B is described for the isolated device 202 interacting with a single other access device 206B to transmit/receive digital assets transactions, this should not be construed as limiting since the isolated device 202 may communicate with a plurality of other access devices 206B associated with multiple other accounts of the digital assets.

As shown in FIG. 3C, a system 200C such as the system 200, may include an isolated device 202A such as the isolated device 202 executing an account manager 220A such as the account manager 220 may be accessible by the user 208A and associated with an account of digital assets regulated by the plurality of computing nodes 204 communicating with each other via the network 230 using the secure consensus protocol(s). The isolated device 202A connected to the network 203 via the access device 206A may be configured and operated to transmit transactions to one or more other isolated devices 202B such as the isolated device 202 executing an account manager 220B such as the account manager 220. Each of the isolated devices 202B which are connected to the network 230 via respective access devices 206B may be accessible by a respective user 208B. The isolated device 202A may be further configured and operated to update its local account with transactions received from one or more of the other isolated devices 202B. While the system 200C is described for the isolated device 202A interacting with a single other isolated device 202B to transmit/receive digital assets transactions, this should not be construed as limiting since the isolated device 202A may communicate with a plurality of other isolated device 202B associated with multiple other accounts of the digital assets.

The exemplary process 100 as well as the exemplary systems 200, 200A, 200B and/or 200C are described herein for a single isolated device 202 associated with a single user 208 and connecting to the network 230 via a single access device 206. However, this should not be construed as limiting since the process 100 and the respective systems 200-200C may be expanded to support a plurality of isolated devices 202 associated with respective users 208 and connecting to the network 230 via multiple access devices 206.

Also, for clarity the isolated device 202 is described to execute the process 100 herein after. However, it should be clear that the account manager 220 executed by the processor(s) 212 of the isolated device 202 is the software module which in fact executes the process 100.

Before describing the process 100 in detail, first is provided some background information relating to blockchains, in particular cryptographic blockchains as known in the art.

Each transaction of digital assets, for example, cryptocurrency, transmitted from an account includes one or more inputs values each corresponding to a respective output value of one or more previous transactions transferred to the account such that a chain (trail) is established for every sum of digital assets transferred between accounts. Each of the transactions further includes one or more output values each designating a value of transferred digital assets and a respective account to which the value is transferred.

Each transaction detected in the blockchain network is recorded by one or more of the computing nodes 204 in one of the blocks of the blockchain using one or more secure consensus protocols employed to ensure that the blockchain is irreversible and immutable and thus immune to tampering to verify non-reproduction and irreversibility of the records recorded in the blockchain. Each of the transactions recorded in the blockchain is associated with a unique identifier computed for the respective transaction which may be used to track and refer to the respective transaction in the blockchain.

The identifier computed for each transaction may be based on the content of the respective transaction, specifically the inputs and outputs in the transaction and may be further based on an index (reference number) of each of the inputs and outputs. The identifier may be computed using one or more methods and/or algorithms, for example, the identifier may be a hash value computed for the content of the transaction using one or more hash functions, for example, Secure Hash Algorithm 256 (SHA256), SHA512 and/or the like.

The identifier of each transaction is computed based on the inputs and outputs of the transaction and may be further based on one or more values of one or more additional parameters, for example, a field and/or a flag defined in the respective transaction according to the protocol of the digital assets blockchain. For example, in some cryptocurrency blockchain protocols, for example, Bitcoin, the identifier may be further based on a lock_time parameter, a flag parameter and/or the like. Moreover, in some cryptocurrency blockchain protocols, for example, Bitcoin cash and/or the like, the computation of the identifier is further based on a signature of the device generating the transaction, i.e., the device from which the transaction originates and transmitted which may be derived from a unique key, for example, a private key assigned to the originating device. However, in other cryptocurrency blockchain protocols, for example, Bitcoin and/or the like, the identifier computed for some transaction types, for example, segwit transactions does not include the signature of the originating device.

According to some embodiments of the present invention, the isolated device 202 executing the process 100 is configured to execute an algorithm adapted to support one or more of the digital assets blockchain protocols, for example, the Bitcoin blockchain in which at least some of the transactions, for example, segwit transactions have identifiers which do not include a signature of the originating device. The process 100 is therefore first described for such digital assets blockchain protocols in which the identifiers computed for the transactions do not include the private key of the originating device.

As shown at 102, the process 100 starts with informing the isolated device 202 of one or more previous transactions of digital assets that are stored (logged) in a depository allocated for the isolated device 202 in another device. For example, assuming the digital assets include cryptocurrency, the other device (s) may serve as a wallet for storing cryptocurrency. Typically, the depository may be allocated in the other device for an isolated device 202 which is associated with an account to which the other device transfers or is predicted to transfer digital assets in a plurality of transactions. For example, assuming the digital assets include cryptocurrency, the other device (s) may serve as hot wallet for storing cryptocurrency.

The other device may include, for example, one or more computing nodes 204 as described in system 200A, an access device 206 as described in system 200B and/or another isolated device 202B as described in system 200C collectively designated other device herein after. As mentioned herein before, the other device may include several computing nodes 204, i.e. a subset of the plurality of computing nodes 204 forming the blockchain network. The subset of computing nodes 204 may employ one or more Multi-Party computation (MPC) protocols as known in the art which may further include one or more multisig (multi-signature) protocols to jointly serve as the other device and interact accordingly with the isolated device 202. For example, assuming the digital assets include a cryptocurrency, the subset of computing nodes 204 employing the MPC protocol(s) may serve as the hot wallet.

Each of the previous transaction(s) is naturally recorded in the distributed ledger, for example, the blockchain by one or more of the computing nodes 204 forming the blockchain network and employing the secure consensus protocol(s) as defined by the protocol of the digital assets blockchain.

Therefore, while the process 100 may be mostly similar for scenarios in which the other device is a network connected device and scenarios in which the other device is an isolated device such as the isolated device 202B there may be slight differences which are described within the process 100 when applicable. The difference may result from the fact that in case the other device is a network connected device, for example, one or more of the computing nodes 240 (system 200A) and/or the other access device 206B (system 200B) the other device may be aware of every transaction made in the blockchain network and recorded in the blockchain and may be thus aware (familiar) of all the previous transactions. In contrast, in case the other device is the isolated device 202B, the other device may not be aware of one or more of the previous transactions recorded in the blockchain.

The previous transactions of digital assets are stored in the depository allocated for the isolated device 102 in the other device in a predefined order that is predefined and known to the isolated device 202. For example, the predefined order may be based on a time of transfer of each previous transaction such that the previous transactions are ordered in the depository according to their transmittal time. In another example, the predefined order may be based on a time of creation of each previous transaction such that the previous transactions are ordered in the depository according to their creation time.

According to some embodiments of the present invention one or more of the previous transactions stored in the depository allocated for the isolated device 202 in the other device are transmitted by the other device to itself and are recorded accordingly in the blockchain. In such case, one or more limited length strings may be inserted, for example, by the user 208 to inform the isolated device 202 of the previous transaction(s) stored in the depository allocated for the isolated device 202, specifically their content information. The content information of each previous transaction which may be provided to the isolated device 202 via one or more limited length strings may include, for example, a time of transmittal (i.e. a position in the order of transaction stored in the depository) of the respective previous transaction, a value of digital assets transferred in the respective previous transaction, the input(s) of the respective previous transaction, the output(s) of the respective previous transaction and/or the like.

Since each such transaction may require substantial effort by the user 208 to be informed to the isolated device 202, the value of digital assets transferred in the previous transaction(s) may typically be sufficiently large to enable transfers of digital assets to the isolated device 202 over a significantly long period of time, for example, a week, a month, a year and/or the like.

According to some embodiments of the present invention one or more of the previous transactions stored in the depository allocated for the isolated device 202 in the other device are transactions that are made (transmitted) by the isolated device 202 to the other device and are recorded accordingly in the blockchain. As such, since the previous transaction(s) originate from the isolated device 202, the isolated device 202 is informed of this previous transaction(s) and has their content information available. Moreover, since the previous transaction(s) originating from the isolated device 202 are stored in the predefined order, for example, their transmittal time, in the depository allocated for the isolated device 202 in the other device, the isolated device 202 is also informed and aware of the position in the order of previous transaction stored in the depository. For example, assuming the predefined order is based on the transmittal time of each previous transaction, the isolated device 202 may log the transmission time of each transaction made to the other device and may track the previous transaction(s) accordingly.

Figure 4:
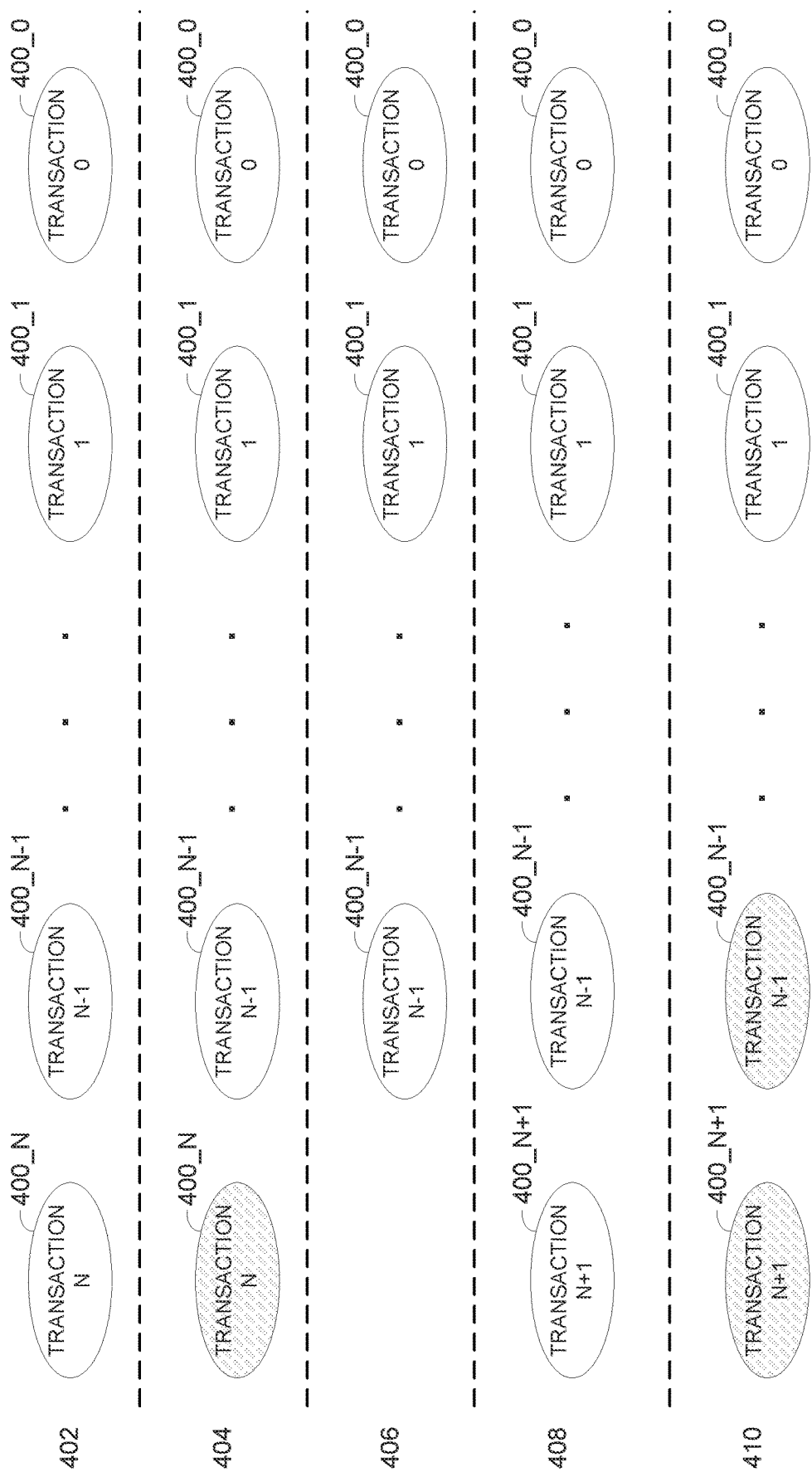
FIG. 4 is a schematic illustration of an exemplary depository allocated in another device for an isolated device for storing previous transactions in a predefined order, according to some embodiments of the present invention.

Reference is now made to FIG. 4, which is a schematic illustration of an exemplary depository allocated in another device for an isolated device for storing previous transactions in a predefined order, according to some embodiments of the present invention. FIG. 4 presents an exemplary depository allocated in an another device for an isolated device such as the isolated device 202. FIG. 4 further presents exemplary transactions made by the other device to an account associated with the isolated device 202.

As seen at 402, a plurality of previous transactions 400 may be ordered in a predefined order in a depository allocated in another device for the isolated device 202. For example, assuming the predefined order is based on the time of transfer of each of the previous transactions 400. A previous transaction 400_0 may be a least recent previous transaction transferred least recently from the isolated device 202 to the other device or from the other device to itself as described herein before. A previous transaction 400_1 may be a second least recent previous transaction transferred after the least recent previous transaction 400_0 and so on to a previous transaction 400_N transmitted most recently from the isolated device 202 to the other device or from the other device to itself.

The other device may transfer digital assets to the account associated with the isolated device 202 in one or more transactions which are recorded with their respective identifier in the digital assets blockchain. However, since the isolated device 202 is isolated from the network 230, the isolated device 202 is not aware of this transaction(s) and may not update its internal balance of the associated account according to the transferred digital assets.

For brevity, transactions from the other device to the account associated with the isolated device 202 nay be sometimes referred to as transactions to the isolated device 202 herein after.

In particular, the other device generates the transactions to the account associated with the isolated device 202 based on one or more of the previous transactions stored in the depository allocated for the isolated device 202 in the other device. Moreover, the other device selects the previous transaction(s) according to their predefined order in the depository, for example, their time of transmittal or time of creation. Specifically, the other device may generate the transactions to the account associated with the isolated device 202 based on one or more most recent previous transactions which were transmitted most recently from the isolated device 202 to the other device.

As seen at 404, the other device may transmit to the account associated with the isolated device 202 a transaction of digital assets created based on the most recent previous transaction 400_N, i.e. the input(s) of the transaction is based on the output(s) of the most recent previous transaction 400_N.

As seen at 406, assuming the entire value of digital assets defined by the output(s) of the most recent previous transaction 400_N is transferred in the account associated with the isolated device 202, the most recent previous transaction 400_N is removed from the depository allocated for the isolated device 202 in the other device.

The identifier computed for each transaction made by the other device to the account associated with the isolated device 202 may be therefore based on the input(s) and output(s) of the respective transaction which are derived from the output(s) of one or more of the previous transactions, specifically one or more of the most recent previous transactions. In the exemplary depository of FIG. 4, the identifier computed for the transaction may be based on the output(s) of the most recent previous transaction 400_N.

Moreover, since the identifier of each transaction may be computed based on the index of each input and/or output, the indexes of the output value(s) may be predefined, in particular, the indexes of the output values transferred to the isolated device 202 and to the other device. For example, the index allocated for output value(s) that are transferred to the isolated device 202 may be predefined and known to the isolated device 202, for example, an index 0. In another example, there may be cases in which an excess transaction returned to the other device, i.e., transferred by the other device to itself, comprising a difference between a value of digital assets of the input(s) used by the transaction and the output value transferred to the isolated device. In such case, the index of the output value transferred to the other device itself is also predefined, for example, an index 1. Furthermore, as the identifier computed for each transaction may be based on one or more of the parameters of the respective transactions, this parameter(s) may be also predefined and known to the isolated device 202.

As seen at 408, in case a new transaction is made from the isolated device 202 to the other device, this transaction is now the most recent previous transaction and is inserted accordingly to the depository as previous transaction 400_N+1. Now, in case an additional transaction is made from the other device to the account associated with the isolated device 202, the other device may create the additional transaction based on the most recent previous transaction 400_N+1.

It is possible that the value transferred from the other device to the account associated with the isolated device 202 exceeds a cumulative value of all outputs of the most recent previous transaction in the depositary. Moreover, in some cases the cumulative value of all outputs of multiple most recent previous transactions may be insufficient for the transferred value. In such case the other device may create the transaction to the account associated with the isolated device 202 based on the outputs of a plurality of most recent transactions which cumulatively equal or exceed the transferred value of the transaction to the account associated with the isolated device 202.

For example, as seen at 410, the other device may transmit to the account associated with the isolated device 202 a transaction of digital assets created based on multiple most recent previous transaction, for example, the most recent previous transaction 400_N+1 and the second most recent previous transaction 400_N−1. This means that the input(s) of the transaction is based on the outputs of the most recent previous transaction 400_N+1 and the second most recent previous transaction 400_N−1. It should be noted that in case the isolated device is not informed of one or more previous transactions made from the other device to the account associated with the isolated device 202, for example, the transaction of 404, the isolated device 202 must be informed of the previous transaction(s) in addition to the current transaction. For example, the limited length strings(s) indicative of the sum of the current transaction (410) should also include the sum and indication of the previous transaction (404) to enable the isolated device 202 to synchronize with all the transaction made to its associated account until the current time thus keep track and synchronizing with the previous transactions stored in the depository.

Furthermore, there may be scenarios in which the cumulative value of the output(s) of the previous transaction(s), specifically the most recent previous transaction(s) used by the other device to create the transaction to the account associated with the isolated device 202 exceed the value of digital assets transferred in the transaction to isolated device 202. In such case the other device may create an excess transaction to itself which comprises a difference between the cumulative value and the transferred value and may store the excess transaction in the depository as the most recent previous transaction. Since the excess transaction is derived from (based on) the most recent previous transaction(s) which the isolated device 202 is informed of (familiar with, the isolated device 202 may infer the contents, i.e., the input and output values of the excess transaction is therefore fully updated with all the transactions in the depository including all excess transactions.

Figure 5:
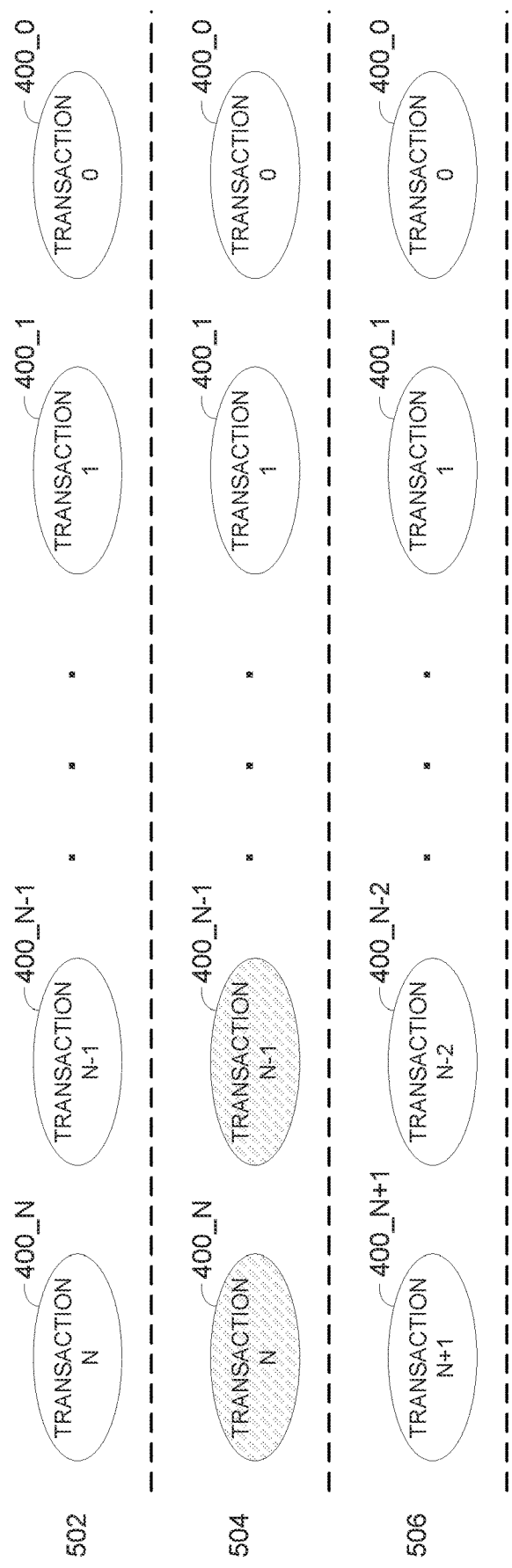
FIG. 5 is a schematic illustration of an exemplary scheme for storing previous transactions in a depository allocated in another device for an isolated device in a predefined order including an excess transaction transferred by the other device to itself, according to some embodiments of the present invention.

Reference is now made to FIG. 5, which is a schematic illustration of an exemplary scheme for storing previous transactions in a depository allocated in another device for an isolated device in a predefined order including an excess transaction transferred by the other device to itself, according to some embodiments of the present invention.

As seen at 502, a plurality of previous transactions 400 are ordered in a predefined order in a depository allocated for an isolated device such as the isolated device 202 as presented in 402.

As seen at 504, the other device may transfer a transaction of a certain value for digital assets to the account associated with the isolated device 202. As described herein before, the other device may create the transaction based on the most recent previous transactions 400, for example, 400_N and 400_N−1. However, the cumulative value of the outputs in the most recent previous transactions 400N and 400_N−1 may exceed the value transferred in the transaction to the account associated with the isolated device 202.

In such case, as seen at 506, the other device may create an excess transaction to itself which comprises the difference between the cumulative value and the transferred value and may store the excess transaction in the depository as the most recent previous transaction 400_N+1. As seen the other device may remove the used most recent transactions 400_N and 400_N−1 from the depository and store the excess transaction as the most recent previous transaction 400_N+1 in the depository.

It should be noted that since the isolated device 202 is familiar with the previous transactions 400 stored in the depository, the isolated device 202 may also infer the content information of each excess transaction such as, for example, the excess transaction 400_N+1 since the input(s) and hence the outputs of the excess transaction 400_N+1 are derived from the output(s) of the previous transactions 400 stored in the depository which the isolated device 202 is informed of and is therefore familiar with. Therefore, storing the excess transaction in the depository as the most recent previous transaction 400_N+1 maintains the ability of the isolated device 202 to track the predefined order of the previous transactions stored in its allocated depository.

Optionally, the other device may use the digital assets transferred to the other device in one or more of the previous transactions stored in the depository allocated for the isolated device 202 for transferring a (second) value of digital assets to one or more other (third) devices associated with other accounts. To this end the other device may make one or more transactions which are created based on one or more of the previous transactions stored in the depository allocated for the isolated device 202, i.e., the input(s) of the transaction(s) to the third device are derived from output(s) of one or more of the previous transactions.

In particular, the other device may create the transaction (s) to the third device based on one or more of the least recent previous transactions in order to ensure that the most recent previous transactions are reserved for transactions to the account associated with the isolated device 202 and thus enable the isolated device 202 to keep track of the predefined order and determine which previous transactions are used for creating the transactions to its associated account.

Figure 6:
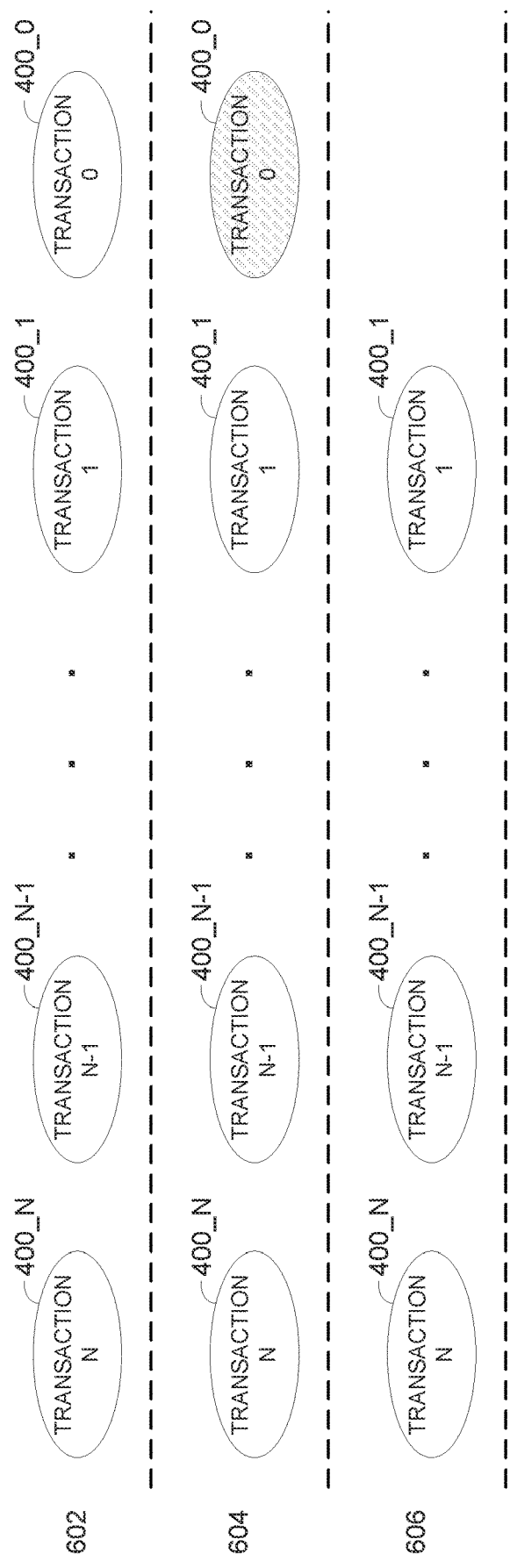
FIG. 6 is a schematic illustration of an exemplary depository allocated in another device for an isolated device for storing previous transactions which is used for transactions to a third device, according to some embodiments of the present invention.

Reference is now made to FIG. 6, which is a schematic illustration of an exemplary depository allocated in another device for an isolated device for storing previous transactions which is used for transactions to a third device, according to some embodiments of the present invention.

As seen at 602, a plurality of previous transactions 400 are ordered in a predefined order in a depository allocated for an isolated device such as the isolated device 202 as presented in 402.

As seen at 604, the other device may transmit a transaction of a second value of digital assets to an account associated with another device, i.e., a third device other than the isolated device 202. The other device may create the transaction to the third device based on one or more least recent previous transaction 400, for example, the least recent previous account 400_0, meaning that the input(s) of the transaction is based on the output(s) of the least recent previous transaction 400_0.

As seen at 606, assuming the entire value of digital assets defined by the output(s) of the least recent previous transaction 400_0 equals the second value transferred to the account associated with the third device, the least recent previous transaction 400_0 is removed from the depository allocated for the isolated device 202. The least recent previous transaction 400_0 is removed from the depository since the output value(s) of the least recent previous transaction 400_0 are used for transactions to the third device. Since the isolated device 202 is disconnected from the network 230 and may not intercept the transaction to the third device, the isolated device 202 is not updated that the least recent previous transaction 400_0 was used. The output values(s) of the least recent previous transaction 400_0 therefore cannot be used for any transaction of digital assets to the isolated device 202.

As described herein before for transactions to the account associated with the isolated device 202, it is possible that the second value transferred to the third device exceeds the cumulative value of all outputs of the least recent previous transaction in the depositary, for example, the least recent previous transaction 400_0. In such case, the other device may create the transaction to the third device based on the outputs of multiple least recent previous transactions, for example, the least recent previous transactions 400_0 and 400_1.

The least recent previous transaction(s) used to create the transaction(s) of the second value(s) may in some point reach and/or overlap with the most recent previous transaction(s) used to create the transaction(s) to the account associated with the isolated device 202. This means that the depository may no longer store sufficient transactions that the isolated device 202 is informed of which may be used by the other device for creating transaction(s) to the account associated with the isolated device 202. In such case the isolated device 202 may need to be re-initialized, i.e. re-informed by repeating step 102.

Optionally, the other device allocates another depository for transactions to any account other than the account associated with the isolated device 202, i.e. for transactions to all third devices other than the isolated device 202. In such case, the other device may create the transaction of the second value to the third device based on one or more previous transactions stored in the other depository. However, in case the value of the output(s) of the previous transactions stored in the other depository is insufficient for the transaction to the third device(s), the other device may create one or more transactions of second values of digital assets to one or more third devices based on the previous transactions stored in the depository allocated for the isolated device 202.

With respect to transactions of second values made by the other device to third devices, there may be scenarios in which the value of digital assets in all output(s) of one or more of the least recent previous transactions is significantly larger compared to the second value transferred to the third device. For example, assuming that the least recent previous transaction 400_0 includes a single output of a value of 5 units of digital assets, for example 5 Bitcoins and the next least recent previous transaction 400_1 includes a single output of a value of 1,000 units of digital assets, for example 1,000 Bitcoins. Further assuming that the other device needs to transfer a second value of 5 units of digital assets, for example 5 Bitcoins to an account associated with a third device. In such case the other device may need to create the transaction to the third device based on both the least recent previous transactions 400_0 and 400_1. However, since the isolated device 202 may be unaware (un-informed) of such transactions made to third devices, once the next least recent previous transaction 400_1 is used, the least recent previous transaction 400_1 cannot be used for making transactions to the account associated with the isolated device 202.

This may be a significant limitation since once the isolated device 202 is not synchronized with the depository, i.e. the isolated device 202 is not informed of all the previous transactions stored in the depository, the isolated device 202 may need to be reinitialized and re-informed of the previous transactions stored in the depository allocated for the isolated device 202 in the other device. Following the previous example, assuming the other device creates the transaction to the third device based on the least recent previous transactions 400_0 and 400_1, a significant value of digital assets, specifically 999 units of digital assets (out of 1000), for example, 999 Bitcoins is no longer available for transactions to the account associated with the isolated device 202.

To overcome this limitation, in case the value of an output of a previous transaction, specifically a least recent previous transaction that needs to be used for transferring the second value of digital assets to the third device is significantly larger than the second value, the other device may split one or more of the previous transactions according to a predefined split scheme known to the isolated device 202, i.e., the isolated device 202 is familiar with the split scheme.

The split scheme may define splitting one or more of the least recent previous transactions stored in the depository allocated for the isolated device 202 to one or more hierarchical split levels where each hierarchical split level comprises a predefined number of artificial sub-transactions. Each of the artificial sub-transactions may inherit (have) the identifier of its parent least recent previous transaction which was split. Each of the artificial sub-transactions may be associated with a predefined sub-value of digital assets (e.g. cryptocurrency) such that a sum of the sub-value of all sub-transactions of a certain split level may equal the value of a next higher hierarchy transaction which may be another artificial sub-transaction or for the top level it may be the least recent previous transaction itself. The predefined value associated with each sub-transaction may be equal for all sub-transaction or it may follow one or more predefined value allocation schemes. For example, the value of each sub-transaction in each hierarchical split level is a predefined fraction (e.g. half) of the value associated with the transactions in the next higher hierarchical split level. In another example, each odd indexed sub-transaction may be associated with a first value while each even indexed sub-transaction may be associated with a second value.

The other device may then transfer at least part of the second value to the third device based on the artificial sub-transactions of one or more of the hierarchal split previous transaction, in particular, the hierarchal split least recent previous transaction(s).

Figure 7:
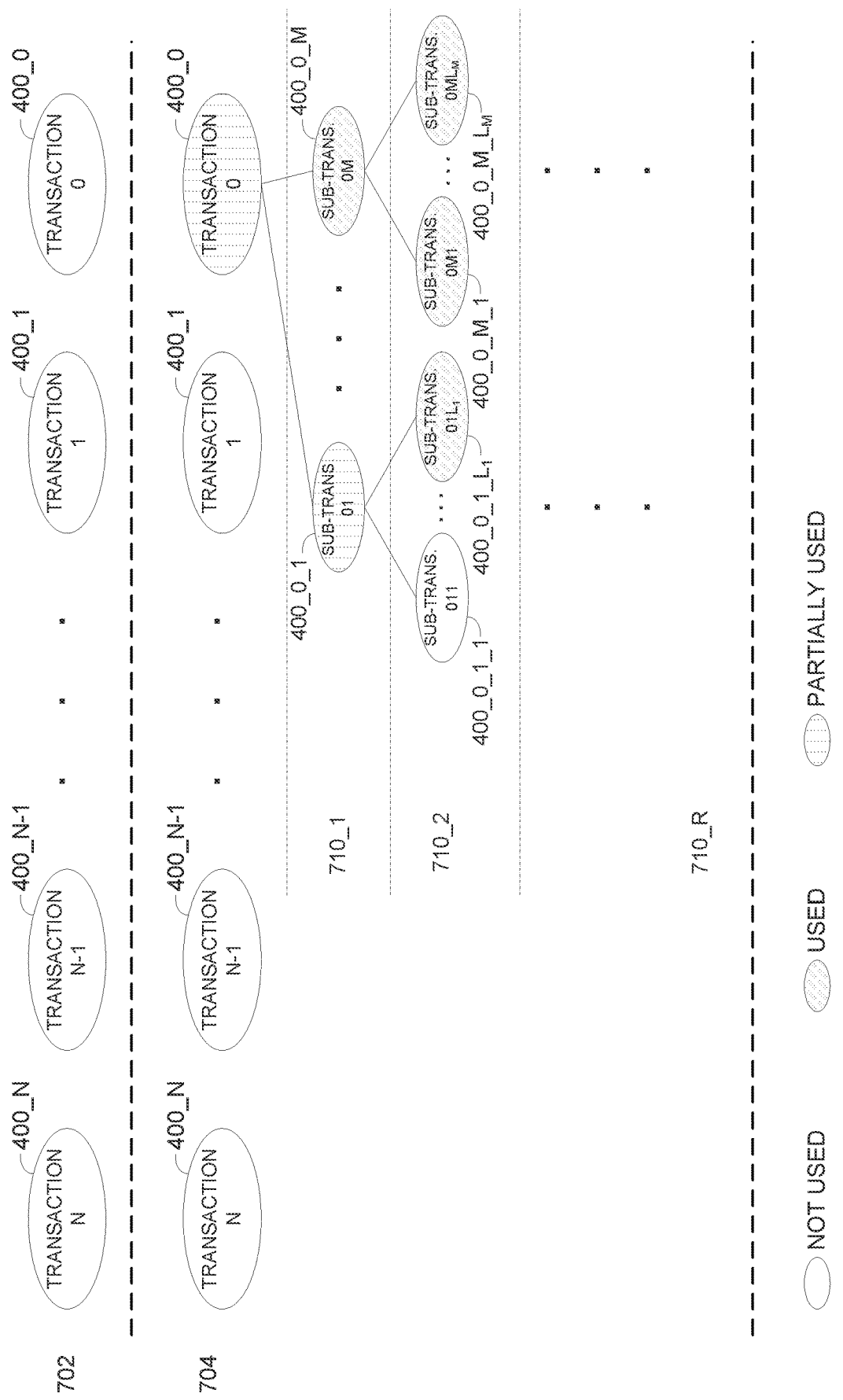
FIG. 7 is a schematic illustration of an exemplary scheme for splitting previous transactions stored in a depository allocated in another device for an isolated device for transactions to another device, according to some embodiments of the present invention.

Reference is now made to FIG. 7, which is a schematic illustration of an exemplary scheme for splitting previous transactions stored in a depository allocated in another device for an isolated device for transactions to another device, according to some embodiments of the present invention.

As seen at 702, a plurality of previous transactions 400 are ordered in a predefined order in a depository allocated for an isolated device such as the isolated device 202 as presented in 402.

As seen at 704, the other device may need to transmit a transaction of a second value of digital assets to an account associated with a third device. However, the second value is significantly smaller compared to the value of digital assets of the output(s) of the least recent previous transaction 400_0. The other device may therefore split the least recent previous transaction 400_0 to a plurality of artificial sub-transactions 400_0_x according to a predefined split scheme. For example, the other device may split the least recent previous transaction 400_0 to a hierarchical structure having M branches, sub-transaction 400_0_1 through 400_0_M each having R hierarchical split levels 710, i.e. each of the branches 400_0_1 through M is R levels deep. Each of the R hierarchical split levels 710_1 through 710_R may include a predefined number of sub-transactions. For example, in the second split level 710_2, the sub-transaction 400_0_1 may be split to $L_1$ sub-transactions 400_0_1_1 through 400_0_1_$L_1$, the sub-transaction 400_0_M may be split to $L_M$ sub-transactions 400_0_1_1 through 400_0_1_$L_{1M}$ and so on. One or more attributes of the split hierarchical structure, for example, the number R of hierarchical split levels 710, the number of sub-transaction of each of the M branches and/or the like may be defined according to one or more parameters, for example, the value of digital assets in the input of the least recent previous transaction 400_0, the desired granularity (resolution) of digital asset values provided by the split and/or the like. Moreover, the number of sub-transactions may be equal in each split level 710 or it may be different as defined by the predefined split scheme. Also, the number of sub-transaction of each of the M branches of the hierarchical structure may be equal or not again as defined by the predefined split scheme.

As shown, the other device may create the transaction of the second value to the third device based on the sub-transactions $400\_0\_m\_r$ (m=1, ..., M, r=1, ..., R). As seen, starting from the left-most sub-transactions, the sub-transactions up to $400\_0\_1\_L_1$ may equal or exceed the second value such that the other device may create the transaction of the second value based on these transactions, i.e. the transactions of all branches 2 through M and up to the left most sub-transaction $400\_0\_1\_L_1$ of the second split level $710\_2$ of branch 1 split from the sub-transaction $400\_0\_1$. As such the first branch may be only partially used since while some or even of the sub-transactions $400\_0\_r$ of the least recent previous transaction $400\_0$ are used for creating the second value transaction other sub-transactions are not used.

The unused sub-transactions may be later used for transferring one or more additional transactions of second value(s) to one or more third devices. Moreover, additional previous transactions 400, specifically least recent previous transactions 400 such as, for example, the next least recent previous transactions $400\_1$ and so on may be split according to the predefined split scheme to enable high flexibility and optimal (minimal) utilization of the previous transactions for transferring a wide range of second values, i.e. small values to large values.

Moreover, the unused sub-transactions may be later used for transferring one or more transactions to the account associated with the isolated device 202. Since the predefined split scheme is known to the isolated device 202, the isolated device 202 may keep track of the previous transactions even when split and may therefore be able to track each of the sub-transactions used for creating the transactions to the account associated with the isolated device 202. This means that the isolated device 202, based on the predefined order and the predefined split scheme may determine and/or infer the input(s) and output(s) of each sub-transaction since it is derived from a higher split level which is initially derived from the respective least recent previous transaction which the isolated device 202 is familiar with.

Optionally, in case the predefined split scheme is not fixed and known in advance, the isolated device 202 may receive one or more limited length strings indicative of one or more of the split attributes, for example, the number R of hierarchical split levels 710, the number of branches M and/or the number of sub-transaction of each of the M branches which as described herein before may be set according to the input of the least recent previous transaction $400\_0$, the desired granularity of digital asset values and/or the like.

Referring once again to FIG. 1.

As shown at 104, the isolated device 202 may receive one or more limited length strings indicative of information of one or more transactions transferred from the other device to the account associated with the isolated device 202. For example, the limited length string(s) may indicate a value of the digital assets transferred in one or more transactions from the other device to the account associated with the isolated device 202.

The isolated device 202 may receive the limited length string(s) via the limited capacity interface 216 operated by the user 208, for example, the user 208 may use a keyboard provided by the limited capacity interface 216 to type the limited length string(s). The limited length string(s) may typically be computed by the access device 206 which may produce the limited length string(s) to reflect the information relating to one or more of the transactions made by the other device to the account associated with the isolated device 202, for example, the transferred value and/or the like. The access device 206 may present the computed limited length string(s) to the user 208 via one or output interfaces available to the access device 206, for example, a display, a printed output and/or the like.

In case the other device is utilized by the isolated device 202B which may not be instantaneously aware of each transaction made in the blockchain network, there may be some gap between the previous transactions which are known (informed) to the isolated device 202B and the previous transactions which are known (informed) to the isolated device 202B. For example, being isolated from the network, the isolated device 202B may be informed of one or more transactions made by the isolated device 202A to the account associated with the isolated device 202B via one or more limited length strings the isolated device 202B may receive via its limited capacity interface 216. Assuming the isolated device 202A transmits a first transaction to the isolated device 202B which is still unaware of when transmitting a second transaction to the account associated with the isolated device 202A. While the isolated device 202B does not create the second transaction based on the first transaction since it still not informed of it, the isolated device 202A may assume that the second transaction is based on the first transaction since it is the most recent transaction.

Therefore, to ensure synchronization between the isolated device 202A and the isolated device 202B, the information inserted to the isolated device 202A via the limited length string(s) may further indicate the previous transaction(s) which the isolated device 202B is currently informed of and were thus used to create the second transaction.

As shown at 106, the isolated device 202 may infer the respective identifier of each of one or more transactions transmitted from the other device to the account associated with the isolated device 202. The isolated device 202 may infer the respective identifier of the transaction based on the value of digital assets transferred in the transaction(s) as indicated by the received limited length string(s) according to the predefined order of the previous transactions used to create the transaction.

As described herein before, the respective identifier computed for each of the transactions made by the other device to the account associated with the isolated device 202 is based on the input(s) of the respective transaction, the output(s) of the respective transaction and optionally further based on the predefined indexes and/or parameters of the respective transaction.

Therefore, since the isolated device 202 is informed (familiar) with the information of the previous transactions stored in the predefine order in the depository allocated in the other device for the isolated device 202, the isolated device 202 may determine from which of the output(s) of the previous transaction(s) the input(s) of the transaction are derived by the other device to create the transaction. Based on the determined output(s), the isolated device may then compute the respective identifier of the transaction according to the used digital assets blockchain protocol as known in the art. For example, assuming the predefined order is based on using the most recent previous transactions in the depository, the isolated device may determine which output(s) of which of the most recent previous transaction(s) was used by the other device to create the transaction and may compute the respective identifier accordingly.

Moreover, one or more parameters which may impact the computation of the identifier, for example, the lock_time, the flag and/or the like may be set to their predefined values as done for computing the respective identifier which was recorded in the blockchain which is described herein before. In addition, the index of the output(s) may also affect the computed respective identifier and the isolate device may thus apply the predefined indexing scheme which assigns a certain index value for output(s) allocated for the isolated device 202 and outputs allocated for the other device.

Moreover, as described herein before, in case, for one or more of the transactions, the value of the output(s) of the previous transaction used to create the respective transaction exceeds the transferred value in the respective transaction, the other device may create an excess transaction for the difference between the digital assets value of the output(s) and the transferred value. Since the isolated device 202 is familiar with the previous transactions stored in the depository, the isolated device 202 may also infer, based on the value of the transferred digital assets indicated by the limited length, the content information of each excess transaction, specifically the input(s) and output(s) of the excess transaction(s). As such the isolated device 202 may compute (infer) the identifier of the transaction from the other device to the account associated with the isolated device 202 if created based on the excess transaction(s).

Furthermore, one or more of the previous transactions, specifically the least recent previous transactions may be split in order to support one or more transactions to one or more third devices. However, the isolated device 202 which is familiar with the previous transactions stored in the depository, their predefined order and the predefined split scheme, may determine, based on the value of the transferred digital assets indicated by the limited length, the portions of the previous transactions that were used for creating the transaction(s) of the second value(s) to the third device(s). Based on this determination, the isolated device 202 may determine if and which of one or more of the split transactions were used by the other device to create the transaction to the account associated with the isolated device 202. As such the isolated device 202 may compute (infer) the identifier of the transaction from the other device to the account associated with the isolated device 202 if created based on the output(s) of the split transaction(s).

According to some digital assets blockchain protocols, one or more of the transactions made in the blockchain network may include a commission allocated to one or more of the computing nodes 204 in reward for recording the respective transaction in the blockchain. As such one or more of the transaction(s) made by the other device to the account associated with the isolated device 202 may also include such a commission value. The commission value is typically expressed, as known in the art, by the difference between the input(s) of a transaction and the output(s) of the transaction. The value of the commission may not be fixed and may therefore prevent the isolated device to accurately determine which output(s) of which previous transaction(s) are used by the other device to create one or more of the transactions to the account associated with the isolated device 202. As such the isolated device 202 may be unable to infer the respective identifier of each of these transaction(s).

To overcome this limitation, the isolated device 202 may be informed of the commission value allocated in each transaction from the other device to the account associated with the isolated device 202. Based on the commission value, the isolated device 202 may determine, based on the transferred value as indicated by the received limited length strings(s), which of the previous transactions was used to create the transaction, i.e. which of the output(s) of which of the previous transaction(s) have sufficient value of digital assets that is equal or exceeds the transferred value after the commission value is deducted.

Informing the isolated device of the commission value may be done using one or more methods, techniques and/or algorithms. For example, the commission value may be predefined and known (informed) to the isolated device 202. For example, the commission value may be predefined to a fixed value. in another example, the commission value may by adjusted in a predefined manner compared to the commission value of one or more previous transactions transferred from the other device to the account associated with the isolated device 202, for example, a preceding transaction. In such embodiments, the commission value may be adjusted according to one or more predefined schemes, for example, increased, decreased, alternated and/or the like by a fixed value, by a percentage and/or the like. In another example, the commission value may be indicated by one or more of the limited length strings typically presented to the user 208 by the access device 206 and inserted by the user 208 to the isolated device 202 via the limited capacity interface 216.

According to some embodiments, the other device applies a predefined commission value for transactions made by the other device to the isolated device 202 based on one or more commission protocol(s) established between the other device and one or more of the computing devices 204 which are configured to record in the blockchain transactions detected in the blockchain network, i.e. miners as known in the art. For example, the commission protocol(s) may define that the commission value is fixed for recording transactions transferred to the account associated with the isolated device 202 in the blockchain. However, the commission protocol(s) may further define a second commission value allocated as reward for a computing node 204 that records one or more of the transactions transferred by the other device to the account associated with the isolated device 202. The second commission, which may be typically high to motivate potential miners, may be transferred to the respective computing node 204 (miner) based on one or more methods, techniques and/or algorithms.

For example, the other device may allocate the second commissions value for one or more transactions subsequent to the transaction to the isolated device 202 and may condition that the same computing node 204 that records the subsequent high commission transaction(s) also record the fixed commission transaction(s) to the account associated with the isolated device 202. As such, the same computing node 204 that records both the transaction(s) to the account associated with the isolated device 202 and the subsequent transaction(s) may receive both the commission value allocated to the transaction(s) to the isolated device 202 (which may optionally be zero) and the second commission allocated for the subsequent transaction(s). In another example, the other device may deliver the second commission directly to the computing node 204 which records the transaction(s) of the other device to the isolated device 202. For example, the other device may set a retainer contract with one or more of the computing nodes 204 such that one of these computing nodes 204 that records in the blockchain one or more of the transactions made by the other device to the isolated device 202 may directly receive the second commission.

As shown at 108, after inferring the respective identifier of the transaction made by the other device to the account associated with the isolated device 202, the isolated device 202 may update its internal balance and records according to the transaction including its respective identifier as recorded in the blockchain. As result, the isolated device may be informed of the transaction and may be thus synchronized with the blockchain. This means that using the updated balance and records of the isolated device 202, the funds, i.e. the digital assets transferred in the transaction may be tracked and accounted for in the blockchain.

Moreover, the digital assets transferred in the transaction may be spent by the user 208 using the isolated device 202 to make one or more transactions made to one or more other accounts of digital assets where one or more of these transactions may be created based on the output(s) of transaction(s) made from the other device for which the isolated device 202 inferred the respective identifier and are thus useable in the blockchain network.

Prior to using the isolated device 202 to make one or more of the transactions from the account associated with the isolated device 202 to one or more of the other accounts, the isolated device 202 may be first synchronized with all previous transactions made between the associated account and any other account. The synchronization may be done by inserting one or more limited length strings to the isolated device 202 via the limited capacity interface 216. The limited length string(s) may be indicative of all transactions related to the associated account which the isolated device 202 is not yet informed of, i.e. the isolated device 202 is not familiar with. In other words, the limited length string(s) may be indicative of all transactions related to the account associated with the isolated device 202 which the isolated device was not previously informed of.

Optionally, the isolated device 202 may validate the information it receives via the limited capacity interface 216 with at least some of the computing nodes 204 using the validation methods described in PCT Application No. IL2019/051330 titled "Secure Consensus over a Limited Connection", filed on Dec. 5, 2019, the contents of which are incorporated herein by reference in their entirety.

Optionally, the other device may allocate a respective depository for each of a plurality of isolated devices such as the isolated device 202. The other device may transfer digital assets to each of one or more of these isolated devices 202 in one or more transactions based on the respective previous transaction(s) stored in the respective depository allocated for the respective isolated device 202. Each such isolated device 202 may execute the process 100 to update its balance of digital assets as recorded in the digital assets blockchain.

According to some embodiments of the present invention, the isolated device 202 executing the process 100 is configured to execute an algorithm adapted to support one or more of the digital assets blockchain protocols, for example, the Bitcoin cash blockchain in which the transactions have identifiers which include a signature of the originating device, specifically the other device. In particular, the respective identifier of each transaction may be computed based on the input(s) derived from the output(s) of the previous transaction(s) and the signature of the other device. To support such protocol(s), the algorithm executed by the isolated device 202 and the other device may be somewhat adjusted.

The signature of the other device which the other device uses to compute the respective identifier for the transaction to the account associated with the isolated device 202 may be derived from a unique key, for example, a unique private key as known in the art which is assigned to the other device and is not publicly published.

In order for the isolated device 202 to infer the respective identifier of the transaction to its associated account, the isolated device 202 may follow the process 100 and may further need access to the private key (uniquely associated with the other device) which is used by the other device to produce its signature which is basis for computing the respective identifier. The isolated device 202 may be informed of the unique private key of the other device using one or more methods and/or techniques. For example, the unique private key of the other device may be generated by the isolated device 202 and transmitted to the other device via the unidirectional secure channel established over the unidirectional transmitter 210 of the isolated device 202. As such the unique private key of the other device is available and known to the isolated device 202. In another example, the unique private key of the other device which the user 208 may insert in one or more limited length strings via the limited capacity interface 216 of the isolated device 202. For example, the user 208 may type the unique private key via the keyboard provided by the limited capacity interface 216. In another example, the unique private key of the other device may be encoded in one or more punched card that may be read by the computer punched card reader provided by the limited capacity interface 216.

Optionally, in case the other device is utilized by the subset of computing nodes 204 employing the MPC protocol(s) as described herein before, the signature used to compute the respective identifiers may be aggregated by the subset of the computing nodes 204. For example, the signature may be derived from an aggregated private key aggregating a plurality of partial privet keys each associated and thus available to only a respective one of the subset of computing nodes 204 which engage in an MPC session to compute the aggregated private key. In another example, the signature may aggregate the signatures of the subset of the computing nodes 204 which are each derived from a respective unique private key of each of the computing nodes 204. The isolated device 202 therefore needs to be informed of the unique private key of each of the computing nodes 204 involved in transferring the transaction to the account associated with the isolated device 202. In such case, the isolated device 202 may be informed of the unique private keys of each of the computing nodes 204 as done for the single other device. However, since it may be impractical to provide the unique private key of all these computing nodes 204 to the isolated device 202 via the limited capacity interface 216, the isolated device 202 may be configured to create the unique private key of all these computing nodes 204 and transmit each of them to the respective computing node 204 in a secure manner via the unidirectional secure channel.

In another example, the isolated device 202 may use one or more secret sharing algorithms, for example, Shamir Secret Sharing (SSS) to transmit partial private signatures to the subset of computing nodes 204 such that the transaction may be signed jointly by the plurality of computing node 204 of the subset using their respective partial private signatures.

Moreover, one or more of the MPC protocol(s) used by the computing nodes 204 may include one or more signature algorithms and/or threshold signature algorithms such as, for example, the multisig (multi-signature) protocol and/or the like, in which only a partial subset of the subset of computing nodes 204 may be sufficient for successfully making the transaction. In such case the signature used to compute the respective identifier may be an aggregation of the signatures of only the partial subset that was involved in the transaction. In such case the isolated device 202 may further need to receive indication of which of the computing nodes 204 of the subset actually took part in the transaction and hence its signature (or partial signature) is used to compute the respective identifier. One or more of the limited length string(s) received by the isolated device 202 as described in step 104 may therefore include an indication of which of the subset of computing nodes 204 of the subset participated in the transaction and the isolated device 202 may thus determine the signature based on the unique private keys of the indicated computing nodes 204. As the limited length string(s) may be typically computed by the access device 206 and presented to the user 208, the access device 206 connected to the network may receive information identifying the participating computing nodes 204 and may compute the limited length string(s) accordingly.

For brevity, the other device is described herein after as a single device. However, the same methods, techniques and algorithms described for the single device may be expanded for implementing the other device by the subset of computing nodes 204 using the same approach as described herein before for the unique private keys assigned to the plurality of computing nodes 204.

Optionally, the isolated device 202 is further configured to infer the respective identifier based on the signature according to one or more malleability parameters which may be applicable as known in the art for the signature of the other device on which the computation of the respective identifier is based. For example, a malicious party may manipulate one or more transactions transferred by the other device to the account associated with the isolated device 202 by altering the signature such that the overall identifier is not changed. The altered transaction may be thus recorded in the blockchain with the valid identifier which may make the transaction untraceable, unidentified and/or the like by the isolated device 202 thus leading to loss of funds included in the transaction. However, the number of possible alterations that may result in a valid identifier is typically very limited and may be detected by one or more of the network connected devices, for example, the access device 206 and/or one or more of the computing nodes 204. The malleability parameter(s) and/or the alteration mode of the transaction may be indicated to the isolated device 202 by one or more of the limited length string received by the isolated device 202 in step 102. The isolated device 202 may be thus aware of the malleability alteration and may be able to track the transaction in the blockchain.

According to some embodiments of the present invention, the isolated device 202 executing the process 100 is configured to execute an algorithm adapted to further support one or more of the digital assets blockchain protocols, in which the transactions have identifiers which are further computed based on random value. In particular, the respective identifier of each transaction may be computed based on the input(s) derived from the output(s) of the previous transaction(s) and the signature of the other device which is further adjusted based on a random value selected by the other device to further increase security and malware immunity of the transaction. To support such protocol(s), the algorithm executed by the isolated device 202 and the other device may be somewhat adjusted.

In order for the isolated device 202 to infer the respective identifier of the transaction to its associated account, the isolated device may follow the process 100 and in addition to the private key of the other device the isolated device 202 may further need to infer the random value selected by the other device to adjust its signature used to compute the respective identifier. The isolated device 202 may apply one or more methods, techniques and/or algorithms to determine the random value selected by the other device to compute the respective identifier of each of the transaction made to the account associated with the isolated device 202.

For example, the isolated device 202 may transmit in advance a plurality of random values to the other device in a secure manner via the unidirectional secure channel. The other device may select one of the random values to adjust its signature and compute the respective identifier of one or more transactions it transmits to the account associated with the isolated device 202. Moreover, the other device may indicate which of the random values was selected, for example, an index of the selected random value. The selected random value, for example, the index of the selected random value may be relayed to the isolated device 202 via one or more of the limited length string(s) provided to the isolated device in step 104 of the process 100. The isolated device 202 which originally transmitted the random values to the other device may thus determine which of the transmitted random values was used and may thus infer the respective identifier which is computed based on the signature adjusted by the selected random value.

In another example, the other device may use one or more predefined random values to adjust its signature and compute the respective identifier of one or more transactions transmitted to the account associated with the isolated device 202. The other device may obtain the predefined random values from one or more sources, for example, the blockchain. These random values are also available to the isolated device 202. As described for the previous technique, the selected random value, for example, an index of the selected random value may be indicated the isolated device 202 via one or more of the limited length string(s) provided to the isolated device in step 104 of the process 100. The isolated device 202 which is familiar with the predefined random values may thus determine which of the predefined random values was used and may thus infer the respective identifier which is computed based on the signature adjusted by the selected random value.

In another example, the isolated device 202 may transmit in advance a random seed to the other device in a secure manner via the unidirectional secure channel. The other device may derive a random value from the random seed in order to adjust its signature and compute the respective identifier of one or more transactions it transmits to the account associated with the isolated device 202. The isolated device 202 which originally transmitted the random seed to the other device may thus deterministically derive the random value that was used and may thus infer the respective identifier which is computed based on the signature adjusted by the derived random value.

Moreover, in some secure algorithms such as, for example, Elliptic Curve Digital Signature Algorithm (ECDSA) and/or the like a malicious party may deduce the private key of the other device based on the identifier extracted from an intercepted transaction and a compromised random value used by the other device to adjust its signature on which the identifier is based. The random values used by the other device to adjust its signature and compute the transactions' identifiers accordingly may be therefore kept secret and available only to the other device in order to prevent such malicious parties from deducing the other device's private key.

Furthermore, the other device may use each random value for adjusting its signature and computing the identifier accordingly for only a single transaction such that a certain random value is never used twice. This may be done to prevent the malicious party from inferring the private key of the other device based on the identifiers extracted from multiple transactions transmitted by the other device. In case the identifiers of the multitude of transactions are computed based on the signature adjusted using the same random value, the malicious party may infer the private key of the other device. The other device may therefore compute the identifier of each transaction based on its signature adjusted by a different random value.

According to some embodiments of the present invention, in particular for digital assets blockchain protocols in which the computation of the respective identifier of each transaction is further based on the signature of the originating (transferring) device, the isolated device 202 may be informed of the private key of the other device after the account from which the transaction is made to the isolated device 202 is empty of digital assets. This limitation may be highly advantageous in case the isolated device 202 may not be trusted or may be potentially operated, owned, compromised and/or hijacked by a malicious party which may use the private key of the other device (known to the isolated device 202 according to the previous embodiments) to gain access to digital assets transferred in one or more transactions from the other device, in particular a network connected other device such as, for example, the access device 106 and/or the computing node(s) 104. Therefore, since the account used to transfer digital assets to the isolated device 202 is empty, while the malicious party may gain access to the used account, this account no longer stores any funds which the malicious party could seize.

In such embodiments, for each transaction made to the isolated device 202, the other device may use all the digital assets stored in a respective account associated with a certain private key which is only valid for the respective transaction to the isolated device 202. The other device may store in the depository allocated in the other device for the isolated device 202 a first transaction associated with a first account, in particular a transaction having one or more high output values of digital assets. It should be stressed that once an account is used it may never be used again.

In a first transaction to the isolated device 202, the other device may create the transaction based on the output(s) of the first transaction. Since the value of digital assets transferred to the isolated device 202 in the first transaction is most likely significantly lower than the digital assets stored in the first account, the other device may the transaction created by the other device may include a first output value directed to the account associated with the isolate device 202 and another output value directed to a second account also associated with the other device. While both the first and second accounts are associated with the other device, the second account is different and separate from the first account and is thus associated with a different private key than the key of the first account. The first output value may equal the value transferred to the account associated with the isolate device 202 while the other output value may equal the difference between the value of digital assets initially stored in the first account and the value transferred to the account associated with the isolated device 202 (i.e., the first output value). Alternatively, the other device may create an excess transaction to itself which comprises the difference between the value of digital assets initially stored in the first account and the value transferred to the isolated device 202. The other device may transfer the excess transaction to the second account.

In a second transaction to the isolated device 202, the other device may create the transaction based on the output(s) of the excess transaction made to the second account. Again, since the value of digital assets transferred to the isolated device 202 in the second transaction is most likely significantly lower than the digital assets stored in the second account, the other device may create the transaction to include a first output value directed to the account associated with the isolated device 202 and another output value equaling the difference between the value of digital assets initially stored in the second account and the value transferred to the isolated device 202 (i.e., the first output value) which is transferred to a third account also associated with the other device and is different from the first and second accounts (having a unique private key).

As stated herein before, each of the accounts allocated for the transactions to the isolated device 202 is associated with a different private key from which the other device derives its signature for computing the identifier of each of the transactions to the isolated device 202. However, the private key associated with each account may be deterministically derived as known in the art from the private key of a succeeding account, for example, the private key associated with the first account is derived from the private key associated with the second account which in turn is derived from the private key associated with the third account.

Since the isolated device 202 is not aware of the private keys of the accounts used to make the transactions, in order for the isolated device to be able to infer the identifier of each such transaction the other device may need to provide the respective private key(s) to the isolated device 202 thus making the private key(s) public. Therefore, when informing the isolated device 202 of the transferred value, the isolated device 202 may also be informed of the respective private key used to create the signature used to compute the respective identifier of the respective transaction. As stated herein before, since the private key of each such account is made public after the digital assets stored in it are transferred, the respective account may never be used again.

The private key however may be significantly long which may present a major limitation to provide it as one or more limited length string(s) via the limited capacity interface 216 of the isolated device 202. However, assuming the other device transfers a plurality of transactions to the isolated device 202, the isolated device 202 may be informed of the plurality of transactions in a single interaction with the single capacity interface 216 in which the following data is provided to the isolated device 202: the value transferred in each of the plurality of transactions and the private key of the account used to transfer the latest transaction to the isolated device 202. The isolated device 202 may be able to follow the deterministic derivation scheme to derive the private keys of all previous transactions made by the other device to the isolated device 202 based on the private key of the last used account and may update its internal balance accordingly.

This implementation may prevent the malicious party which operates, owns, compromises and/or hijacks the isolated device 202 from gaining access to digital assets of the other device since the accounts used to make the transactions to the isolated device 202 are already empty and are therefore useless even if their private key is now available to the malicious party.

In a first exemplary embodiment of the private key derivation from a succeeding private key, the other device may use one or more hash functions to generate a plurality of hash values (hash codes) such that each hash value is deterministically derived from a preceding hash value. The other device may then use the plurality of hash values to generate a plurality of private keys for a plurality of accounts stored in the depository allocated in the other device for the isolated device 202 for transferring a plurality of transactions of digital assets from the other device to the account associated with the isolated device 202. Specifically, the other device may create private keys based on the hash values in reverse order, for example, a first private key associated with a first account in the depository may be generated based on the last hash value, a second private key associated with a second account in the depository may be generated based on a one before last hash value and so on. As such in the first transaction of digital assets from the first account in the depository to the account associated with the isolated device 202, the identifier of the first transaction may be computed based on the first private key of the first account which was generated based on the last hash value. In the second transaction of digital assets from the second account in the depository, the identifier of the second transaction may be computed based on the second private key of the second account which was generated based on the one before last hash value.

After a plurality of such transactions, the isolated device 202 may be informed via one or more limited length strings of the following information: the transferred value and a single encoded value which is the encoded value of the hash associated with the private key of the account used for the latest transaction to the account associate with the isolated device 202. Since each hash value is deterministically derived from its preceding hash value, the isolated device 202 may decode the last received encoded value comprising the most preliminary hash value of the chain and may derive the hash value which was used to create the previous hash value used to encode the previous transaction and so on the isolated device 202 may recursively derive all hash values from the most preliminary hash value. It should be noted that the values encoded by the other device using the hash values may not necessarily be the private keys themselves but may be deterministically indicative of the private keys of the respective accounts from which the respective transactions are made and the isolated device 202 may therefore infer the private keys of the accounts used for the plurality of transactions to its associated account and may update its internal balance accordingly.

In another exemplary implementation, the isolated device 202 may use an encryption-decryption key pair scheme to identify and collect the plurality of private keys associated with the accounts used for the plurality of transactions from the other device to the isolated device 202. In particular, the other device may first publicly publish the decryption key encryption-decryption key pair including to the isolated device 202 while keeping secret the encryption key of the encryption-decryption key pair. The private key associated with each used account may be based on encrypting using the encryption key the base value from which the private key associated with the account used for the preceding transaction is created from. Therefore, assuming that, after the plurality of transactions are transferred from the other device to the account associated with the isolated device 202, the isolated device 202 is informed of the with the encrypted value used for the latest transaction, the isolated device 202, using the decryption key may recursively decrypt the encrypted values used for all the transactions preceding the latest transaction and deduce the appropriate private keys from them. The isolated device 202 may therefore infer the private keys associated with all the accounts used for the plurality of transactions to its associated account preceding the latest transaction and may update its internal balance accordingly. The advantage in this exemplary implementation is that it does not limit the number of possible private key. This is in contrast to the first exemplary implementation in which a maximum number of possible private keys must be predefined in advance due to the reverse recursive construction of the private keys based on the hash values where the last hash value is used first, to generate the first private key and so on.

According to some embodiments of the present invention, the isolated device 202 may create in advance a plurality of valid transactions for a predefined number of hierarchical split levels and compute their respective identifiers using the private key of the other device. The isolated device 202 may then transmit the plurality of valid transactions to the other device which may update accordingly the depository allocated for the isolated device 202. In particular, the other device may store the plurality of valid transactions in the depository according to the predefined order, for example, based on their time of transmittal, time of creation and/or the like.

Optionally, in case the other device is utilized by the subset of computing nodes 204 employing the MPC protocol(s) as described herein before, the isolated device 202 may use one or more of the secret sharing algorithms to transmit a plurality of partial valid transactions of each of the plurality of valid transactions to the plurality of computing nodes 204 of the subset such that each valid transaction may be created jointly by the plurality of computing node 204 of the subset using their respective partial valid transactions.

When transferring a transaction to the account associated with the isolated device 202, the other device may select one or more of the valid transactions and may transmit the transaction to the account associated with the isolated device 202 which is recorded in the blockchain with the respective identifier. The selected transaction(s), for example, an index of the selected transaction(s), may be indicated to the isolated device 202 via one or more of the limited length string(s) provided to the isolated device 202 in step 104 of the process 100. Since the valid transaction are originally created by the isolated device 202 and are thus known to the isolated device 202 including their respective identifiers, the isolated device 202 may identify the selected valid transaction(s) and may determine its respective identifier.

Moreover, as described herein before, the other device may use one or more of the previous transactions stored in the depository in order to create transactions of one or more second values of digital assets to accounts associated with one or more of the third devices. In such case, the other device may select one or more of the least recent valid transaction from the depository according to the required second value and may use it to create one or more of the transactions to one or more of the third devices.

The isolated device 202 may further create a plurality of valid transactions for a predefined number of hierarchical split levels using the private key of the other device for one or more excess transactions transferred from the other device to itself comprising the difference between the transferred value and a cumulative value of digital assets of one or more outputs of one or more most recent transactions of the plurality of valid transactions stored in the depository. As such excess transactions may be also transformed to valid transactions that are known to the isolated device 202 and thus may be used as described for the valid transactions.

Optionally, the isolated device 202 may create in advance a plurality of valid transactions for a plurality of predefined values of digital assets for a predefined number of hierarchical split levels and compute their respective identifiers using the private key of the other device. The isolated device 202 may then transmit the plurality of valid transactions to the other device which may update accordingly the depository allocated for the isolated device 202. In particular, the other device may store the plurality of valid transactions in the depository according to the predefined order, for example, based on their time of transmittal, time of creation and/or the like. When transferring a transaction to the account associated with the isolated device 202, the other device may select the valid transaction according to the transferred value and may transmit the transaction to the account associated with the isolated device 202 which is recorded in the blockchain with the respective identifier. The isolated device 202 may determine which of the valid transactions was selected based on the transferred amount indicated by the limited length string(s) and may determine its respective identifier.

Optionally, the other device receives the plurality of valid transactions for the plurality of predefined values of digital assets for the predefined number of hierarchical split levels and stores each of the valid transactions in a respective one of a plurality of depositories allocated for the isolated device 202 in the other device. When transferring a transaction to the account associated with the isolated device 202, the other device may create the transaction based on one or more of the valid transactions selected from the plurality of depositories according to the transferred value. The isolated device 202 may determine which of the valid transactions was selected based on the transferred amount and may compute its respective identifier. Since the valid transaction are originally created by the isolated device 202 and are thus known to the isolated device 202 including their respective identifiers, the isolated device 202 may identify the selected valid transaction(s) and may determine its respective identifier.

Optionally, the isolated device 202 may create in advance one or more valid predefined value transactions which comprise a plurality of output values each for a predefined limited value of digital assets, for example, 1 unit of digital assets, such as, for example, 1 Bitcoin. While the limited value may be fixed for all the outputs, it is not mandatory as long as the limited values are predefined and known to the isolated device 202. The isolated device 202 may then transmit the valid predefined value transaction(s) to the other device may store the valid predefined value transaction(s) in the depository according to the predefined order. When transferring a transaction to the account associated with the isolated device 202, the other device may create the transaction based on the limited output values of one or more of the valid predefined value transaction(s) according to the transferred value. Applying this method may enable indicating only the total sum of multiple transactions to the account associated with the isolated device 202 since the isolated device 202 which is aware of the limited value of each output may infer which output(s) of which predefined value transaction(s) were used to create the multitude of transactions.

According to some embodiments of the present invention, the other device, specifically an isolated device such as, for example, the isolated device 202B may allocate a single depository for two other (different) isolated devices 202 such as the isolated device 202A. The previous transactions stored in the single depository may be used by the isolated device 202B to create transactions to the first isolated device 202A and one or more other stored previous transactions may be used by the isolated device 202B to create transactions to the second isolated device 202A.

Following the same methods and algorithms described herein before, each of the two isolated devices 202A is informed of the previous transactions that are allocated for it in the single depository as described herein before in step 102 of the process 100. However, each of the two isolated devices 202A may be potentially informed on all of the previous transactions stored in the single depository. Since each of the two isolated devices 202A is informed of all the stored previous transactions, each of these previous transactions may be used to create either transactions transferred to the account associated with the first isolated device 202A or transactions transferred to the account associated with the second isolated device 202A. This may allow high flexibility for the isolated device 202B which may be able to store a plurality of previous transaction in the single depository without explicitly allocating them in advance for one of the two isolated devices 202A or the other. Rather the previous transactions, informed (known) to both the isolated devices 202A may be used by the isolated device 202B to create transactions either to the first or second isolated device 202A as needed in real-time.

In order to maintain a coherent depository in which the previous transactions are separately allocated for each of the two isolated device 202A, the previous transactions may be stored in the single depository in a predefined order. For example, the previous transactions may be stored in the single depository in a linear manner such previous transactions starting from a left-most previous transaction are allocated for the first isolated device 202A and previous transactions starting from a right-most previous transaction are allocated for the second isolated device 202A. Naturally, the isolated device 202B may not use the previous transactions stored in the single depository for creating transaction to accounts associated with one or more third devices other than the two isolated devices 202A.

The isolated device 202B may thus transfer one or more transactions to the account associated with the first isolated device 202A where each such transaction is created based on one or more left-most previous transactions using the same methods described herein before. Complementary, the isolated device 202B may transfer one or more transactions to the account associated with the second isolated device 202A where each such transaction is created based on one or more right-most previous transactions.

Figure 8:
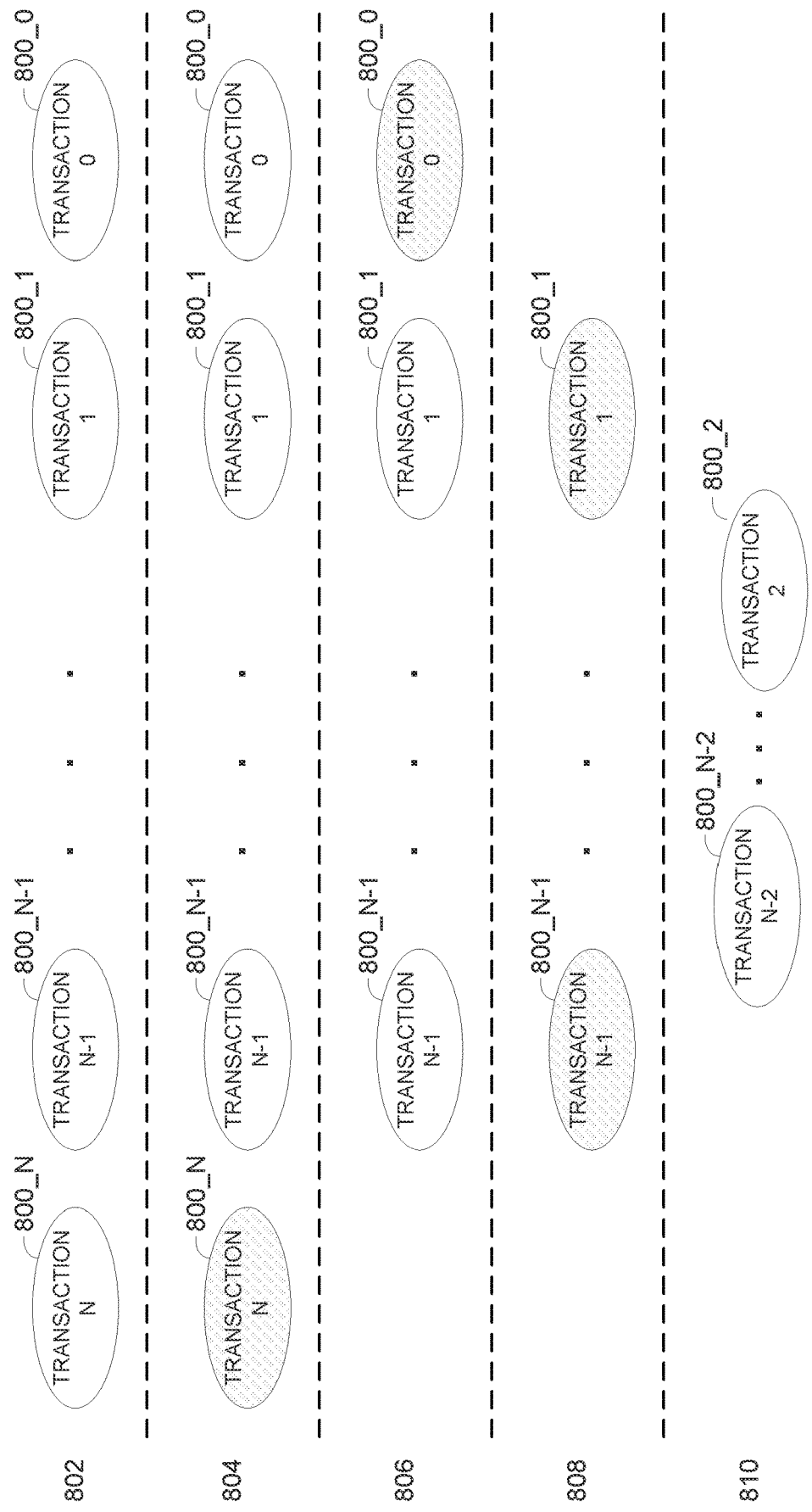
FIG. 8 is a schematic illustration of an exemplary scheme for storing previous transactions in a predefined order in a single depository allocated in another device for two independent isolated devices, according to some embodiments of the present invention.

Reference is now made to FIG. 8, which is a schematic illustration of an exemplary scheme for storing previous transactions in a predefined order in a single depository allocated in another device for two independent isolated devices, according to some embodiments of the present invention. FIG. 8 presents an exemplary single depository allocated in an isolated device such as the isolated device 202B for two different isolated devices such as the isolated device 202A. FIG. 8 further presents exemplary transactions made by the isolated device 202B to accounts associated with the two different isolated devices 202A.

As seen at 802, a plurality of previous transactions 800, for example, transactions 800_0, 800_1 through 800_N may be ordered in a predefined order in a single depository allocated in the isolated device 202B for the two different isolated devices 202A.

The previous transactions 800 may be arranged in the single depository such that the isolated device 202B may use one or more left-most previous transactions to create each of one or more transactions to the first isolated device 202A. The isolated device 202B may further use one or more right-most previous transactions to create each of one or more transactions to the second isolated device 202A. The first and second isolated devices 202A may be each informed of this predefined arrangement such that the first isolated device 202A is aware that transactions to its associated account are made by the isolated device 202B based on the left-most previous transaction(s) and the second isolated device 202A is aware that transactions to its associated account are made by the isolated device 202B based on the right-most previous transactions.

As seen at 804, the isolated device 202B may transmit to the account associated with the first isolated device 202A a transaction of digital assets created based on the left-most previous transaction 800_N, i.e. the input(s) of the transaction is based on the output(s) of the left-most previous transaction 800_N.

As seen at 806, assuming the entire value of digital assets defined by the output(s) of the left-most previous transaction 800_N is transferred in the account associated with the first isolated device 202A, the left-most previous transaction 800_N is removed from the depository.

As described herein before, the identifier computed for each transaction made by the isolated device 202B to the account associated with the first isolated device 202A may be therefore based on the input(s) and output(s) of the respective transaction which are derived from the output(s) of one or more of the previous transactions, specifically one or more of the left-most previous transactions. In the exemplary depository of FIG. 8, the identifier computed for the transaction may be based on the output(s) of the left-most previous transaction 800_N.

As further seen at 806, the isolated device 202B may transmit to the account associated with the second isolated device 202A a transaction of digital assets created based on the right-most previous transaction 800_0, i.e. the input(s) of the transaction is based on the output(s) of the right-most previous transaction 800_0.

As seen at 808, assuming the entire value of digital assets defined by the output(s) of the left-most previous transaction 800_0 is transferred to in the transaction the account associated with the second isolated device 202A, the right-most previous transaction 800_0 is removed from the depository.

As further seen at 808, the isolated device 202B may transmit two separate transactions to the accounts associated with the first and second isolated devices 202A. As seen, the isolated device may create the transaction to the account associated with the first isolated device 202A based on the outputs of left-most previous transaction, specifically the previous transaction 800_N-1. The isolated device may further create the transaction to the account associated with the second isolated device 202A based on the outputs of right-most previous transaction, specifically the previous transaction 800_1.

As seen at 810, assuming the entire value of digital assets defined by the output(s) of the left-most previous transaction 800_N-1 and the right-most transaction 800_1 are transferred in the transactions to the accounts associated with the first and second isolated device 202A respectively, the left-most previous transaction 800_N-1 and the right-most previous transaction 800_1 are removed from the depository.

It should be notes that features described herein before for one or more of the previous embodiments, for example, the predefined parameters, the predefined indexes, the excess transactions which may be made by the isolated device 202B to itself and/or the like are applicable for the single depository embodiment. Moreover, the isolated device 202B may further split one or more of the previous transactions 800 according to a predefined split scheme as described herein before to avoid excess transactions which may disrupt the arrangement of the previous transactions 800 in the shared single depository. The first and/or second isolated devices 202A may be further informed of such splitting (via limited length string(s)) in order to synchronize with the splitting accordingly and be able to infer the identifier of the transactions made by the isolated device 202B to their associated accounts.

According to some embodiments of the present invention, the isolated device 202, for example, the isolated device 202B may be configured to create single depository which may be used to create transactions to multiple accounts associated with a plurality of other devices. The plurality of other devices may include either network connected device such as for example, the computing nodes 204 and/or the access devices 206 as well as to other isolated devices 202 such as, for example, the isolated device 202A.

The single depository may be constructed as an array which may be regarded as single previous transaction comprising a plurality of outputs where each of the plurality of outputs may have a predefined value of digital assets. The predefined value may be fixed for all the outputs or the values of the outputs may be predefined according to one or more predefined schemes as described herein before. Each of the plurality of other devices may follow the same algorithm and may be informed of the previous transaction outputs and their predefined values such that each of the plurality of other devices is familiar with the previous transaction and the outputs.

The isolated device 202B may create the array (previous transaction) of outputs by transferring to itself a transaction comprising a plurality of outputs such that the transaction is recorded in the blockchain. However, optionally, the isolated device 202B may create the transaction comprising the plurality of outputs but does not transmit the transaction to the blockchain network such that it is not recorded in the blockchain. Rather, the isolated device 202B may locally maintain the virtually created array of the plurality of outputs.

Reference is now made to FIG. 9A, FIG. 9B, FIG. 9C and FIG. 9D, which are schematic illustration of an exemplary depository allocated in an isolated device for transferring digital assets to a plurality of other devices, according to some embodiments of the present invention.

While this implementation may be primarily used by an isolated device (cold wallet) such as the isolated device 202B to create a single depository for transferring digital assets to a plurality of other devices, this implementation may be also used by a network connected device associated with a digital assets account (hot wallet), for example, the access device 206, the computing node 204 and/or the like for the same purpose, i.e., maintaining a single depository for transferring digital assets to a plurality of other devices.

Figure 9A:
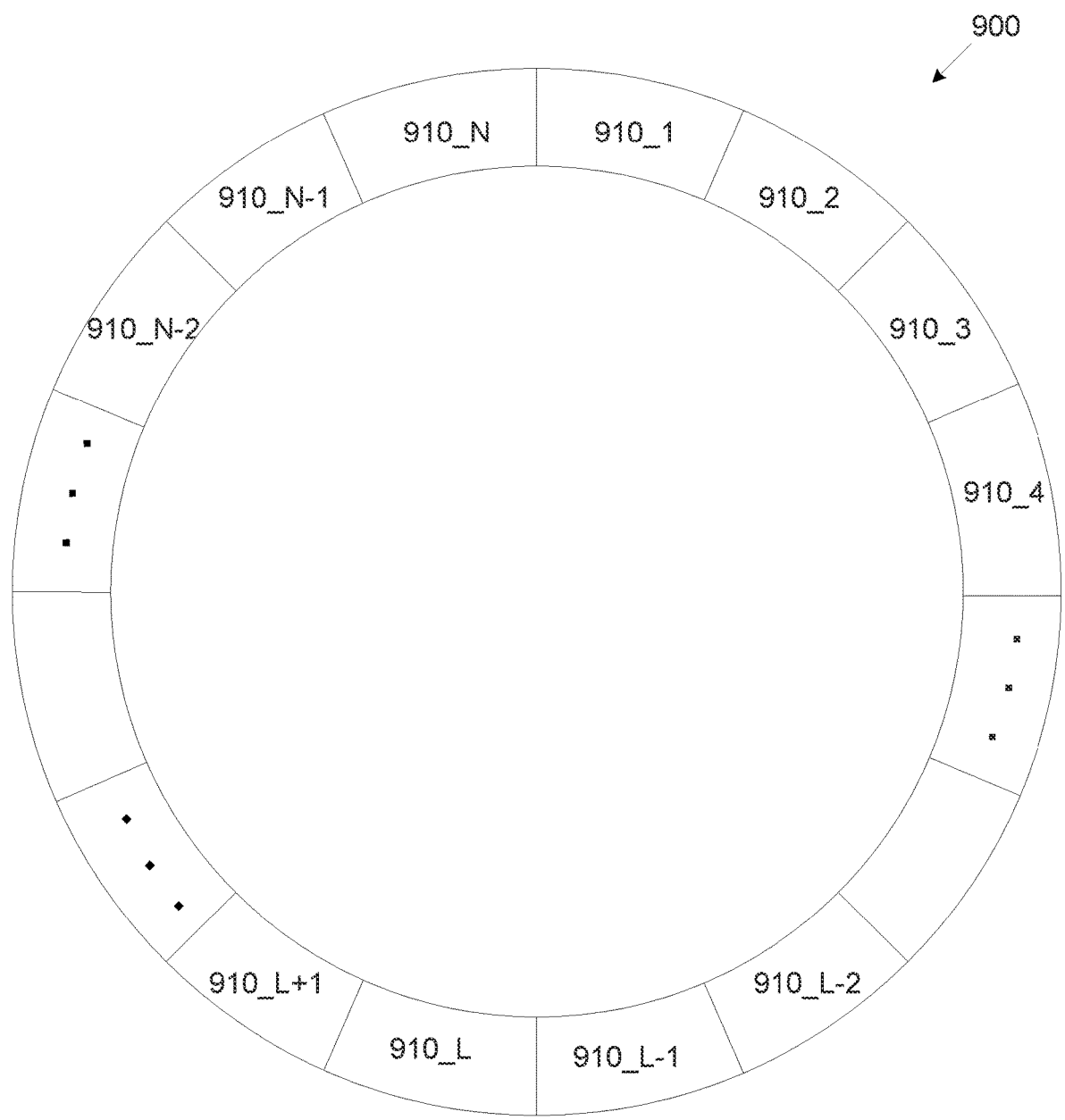
FIG. 9A, FIG. 9B, FIG. 9C and FIG. 9D are schematic illustration of an exemplary depository allocated in an isolated device for transferring digital assets to a plurality of other devices, according to some embodiments of the present invention.

As shown at FIG. 9A, an isolated device such as the isolated device 202B may create a single depository 900 constructed as array of a plurality of outputs 910, for example, 910_1, 910_2, 910_3, 910_4, . . . , 901_L-2, 910_L-1, 910_L, 910_L+1, . . . , 910_N-1, 910+N-1, 910_N each having a respective predefined value. The isolated device 202B may create the depository 900 by transferring one or more transactions to itself which cumulatively have the plurality of outputs 910_1 through 910_N. For example, the isolated device 202B may transfer a single transaction comprising the plurality of outputs 910_1 through 910_N. In another example, in particular in case there is a limitation on the number of outputs allowed for a single transaction, the isolated device 202B may transfer first transaction comprising a certain number of outputs followed by a plurality of second transactions each comprising an input which corresponds to a respective one of the outputs of the first transaction. The isolated device 202 may repeat this process and initiate additional transactions derived from the previous transactions until reaching the desired number of outputs 910_1 through 910_N.

When the isolated device 202B makes a transaction to transfer a value of digital assets to an account associated with one of the plurality of other devices, the isolated device 202B may create the transaction, specifically select the input(s) of the transaction, based on one or more outputs selected from the array of outputs according to the transferred value.

The isolated device 202B may thus transfer a plurality of transactions each of a respective value of digital assets to a plurality of accounts associated with one or more of the plurality of other devices. The output(s) selected by the isolated device 202B to create each of the plurality of transactions is of course an output which is not yet used, i.e. was not previously used by the isolated device 202B to create a past transaction. Each of the other devices receiving a transaction from the isolated device 202B may be informed of the transferred value as well as an index of the outputs used to make the respective transaction, specifically the index of the first used output. In case the other device is an isolated device such as the isolated device 202, the index may be provided as one or more limited length strings, for example, the limited length string(s) used to inform the isolated device 202 of the transferred value.

Figure 9B:
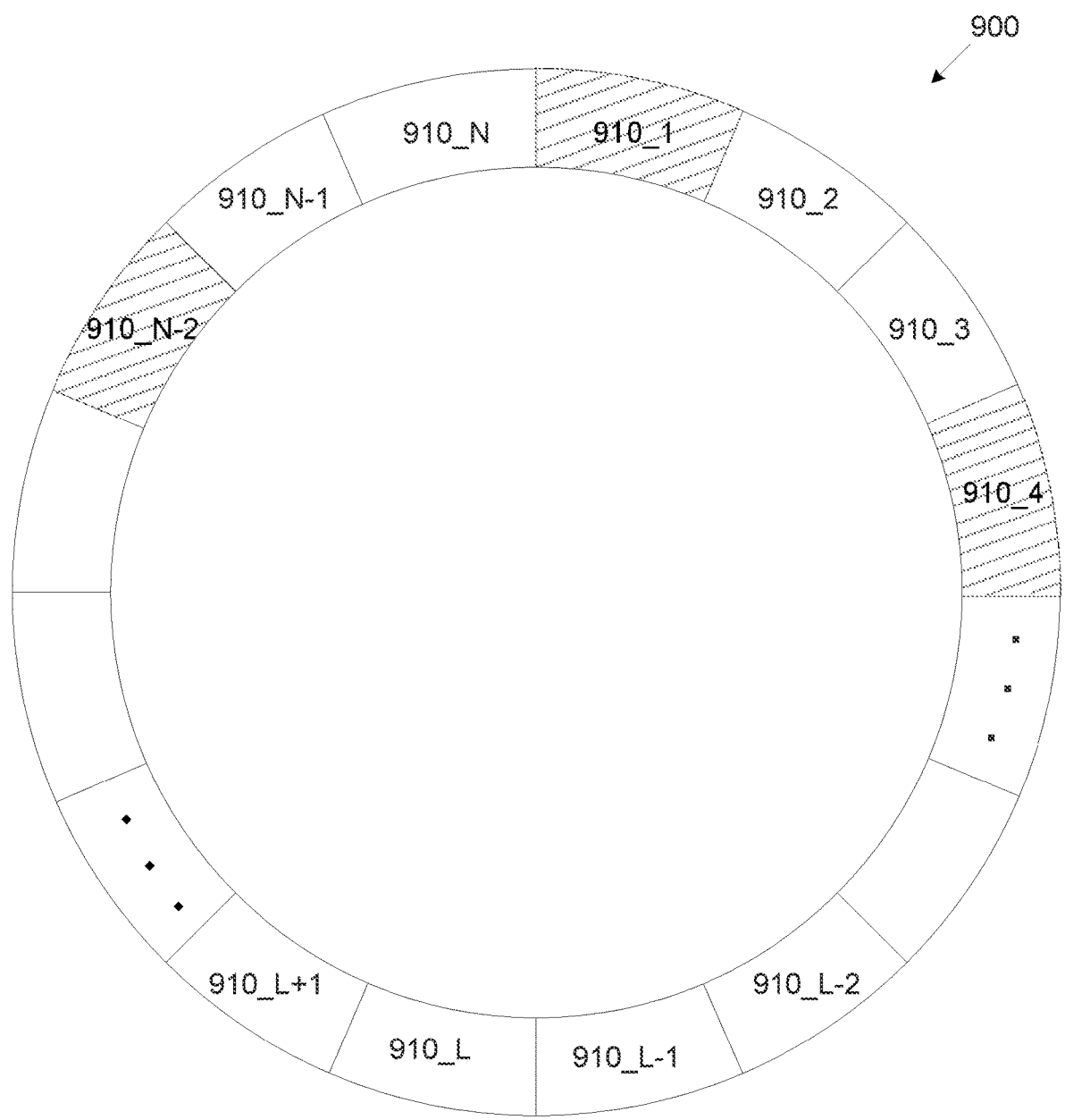

For example, as shown at FIG. 9B, the isolated device 202B may create a first transaction of a certain transferred value to an account associated with one of the plurality of other devices based on one of the outputs 910 in the depository 900, for example, the output 910_1 selected according to the transferred value, meaning that the input(s) of the first transaction is derived from the output 910_1. In another example, the isolated device 202B may create a second transaction of a certain transferred value to an account associated with another device based on another one of the outputs 910 in the depository 900, for example, the output 910_4 selected according to the transferred value, i.e., the input(s) of the second transaction is derived from the output 910_4. In another example, the isolated device 202B may create a third transaction of a certain transferred value to an account associated with yet another device based on another one of the outputs 910, for example, the output 910_N−2 selected according to the transferred value, i.e., the input(s) of the third transaction is derived from the output 910_N−2.

It should be noted that while the first, second and/or third transactions may be transferred to different accounts associated with different other devices, multiple transactions of the first, second and/or third transactions may be transferred to a single other account.

Optionally, the isolated device 202B may create one or more transactions of a certain transferred value to an account associated with one of the plurality of other devices based on a subset of consecutive outputs of the plurality of outputs selected according to the transferred value such that a cumulative value of digital assets of the subset of consecutive outputs is equal or exceeds the transferred value.

Figure 9C:
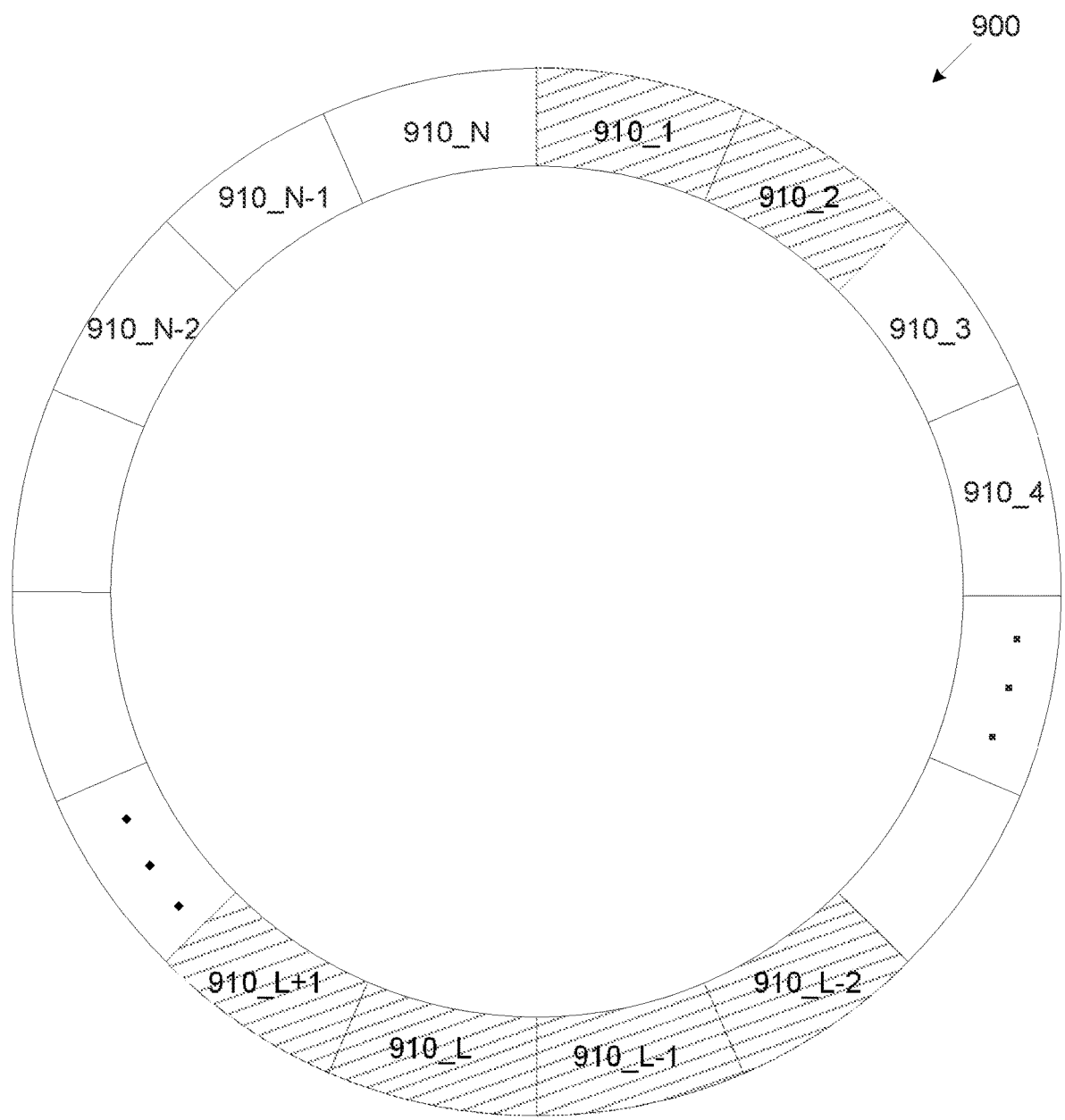

For example, as shown at FIG. 9C, the isolated device 202B may create a first transaction of a certain transferred value to an account associated with one of the plurality of other devices based on a subset of outputs 910 in the depository 900, for example, the outputs 910_1 and 910_2 selected to equal or exceed the transferred value, meaning that the input(s) of the first transaction is derived from the outputs 910_1 and 910_2. In another example, the isolated device 202B may create a second transaction of a certain transferred value to an account associated with one of the plurality of other devices based on a subset of outputs 910 in the depository 900, for example, the outputs 910_L−2 through 910_L+1 selected to equal or exceed the transferred value, meaning that the input(s) of the second transaction is derived from the outputs 910_L−2, 910_L−1, 910_L and 910_L+1.

It is possible that following multiple transactions made by the isolated device 202 to the other devices, the array of outputs which constitutes the depository 900 may eventually become significantly segmented. This may present a problem for the isolated device 202B since it may be unable to create additional transactions specifically transactions of a transferred value requiring selection of a subset of consecutive outputs since there may be insufficient such outputs, specifically insufficient consecutive outputs having a cumulative value that is equal or exceeding the value required to be transferred by the transaction.

In such case, the isolated device 202B may create one or more transactions to one or more of the other devices which are each created based on non-consecutive outputs or even non-consecutive subsets of outputs. In such case the other device may be informed of the transferred value as well as the index of each of the non-consecutive outputs used to make the respective transaction, specifically the index of the first output of each use subset of outputs.

However, in case the depository 900 of the isolated device 202B becomes too segmented such that the isolated device 202 cannot efficiently create additional transactions, the depository 900 may need to be re-initialized, for example, restarted with another previous transaction comprising a plurality of outputs which is informed to the plurality of other devices.

Optionally, the isolated device 202B may create the previous transaction stored in the depository 900 to comprise a plurality of recursive transactions each comprising a predefined number of a plurality of outputs of predefined values of digital assets such that a plurality of split levels may be created for each of the outputs of the previous transaction. The isolated device 202B configures the recursively created transactions such that the transaction created in each iteration cumulatively equal to an output of a respective output of a previous iteration. The split levels may be created to allow for a finer granularity of the value of digital assets of each of the outputs which may allow for a more accurate creation of the transactions to the other accounts with no major excess requiring the isolated device 202B to create excess transactions to itself with the difference. This may be highly advantageous since the other devices, specifically other isolated devices 202 may not be informed (aware) of such excess transactions and the isolated device 202B may therefore not be able to use the digital assets of these excess transactions which are not known to the other devices.

Figure 9D:
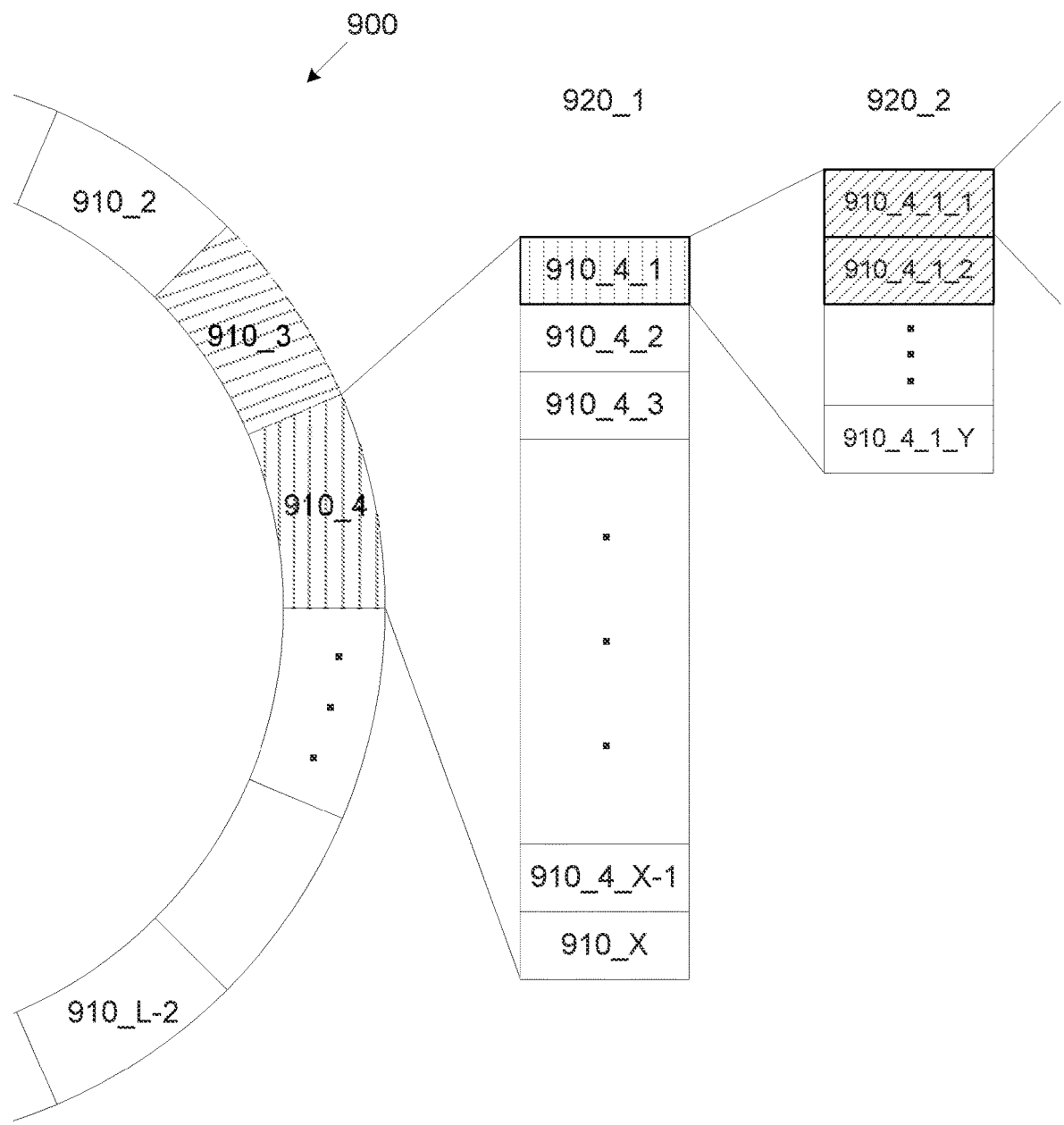

For example, as shown at FIG. 9D, the isolated device 202B may construct an array by creating a previous transaction comprising the plurality of outputs 910 stored in the depository 900. The isolated device may further configure the depository 900 such that each of the transactions 900 may be recursively split to a plurality of transactions each having a predefined value output 910_$n$_$x$ where $n=1$ through N and x denotes a split number. For example, the output 910_4 may be recursively split in a plurality of iterations to create a plurality of split levels 920 each comprising a predefined number of outputs according to the split number. For example, a split level 920_1 may include X outputs, for example, 910_4_1, 910_4_2, 910_4_3, through 910_4_X−1, 910_4_X. Moreover, each of the outputs of the split level 910_1 may be further split in another split level 920_2 to Y outputs, for example, 910_4_1_1, 910_4_1_2, through 910_4_1_Y.

When the isolated device 202B transfers a transaction of a certain value to an account associated with one of the plurality of other devices, the isolated device 202B may select the outputs 910 which cumulatively equal or slightly exceed the transferred value. In particular, the isolated device 202B may select the outputs 910 in a gradual increasing order through the recursively created split levels to select consecutive outputs that cumulatively equal the transferred value or if unavoidable slightly exceed the transferred value.

For example, assuming the isolated device 202B needs to transfer a transaction of a certain value to an account associated with one of the plurality of other devices. The isolated device 202B may determine based on the transferred value that the outputs 910_3 and 910_4 may be selected as their cumulative value exceeds the transferred value. However, assuming that the isolated device 202B determines that the cumulative value significantly exceeds the transferred value, the isolated device 202B may thus progress down the recursively created outputs 910, specifically to the next split level 920_1 of the output 910_4. Moreover, assuming that the isolated device 202B determines that the cumulative value including the first output of the split level 920_1 still significantly exceeds the transferred value, the isolated device 202B may further progress down the recursively created outputs 910, specifically to the next split level 920_2 of the output 910_4. Assuming that the isolated device 202B determines that the first two outputs 910_4_1_1 and 910_4_1_2 cumulatively with the output 910_3 are sufficient to equal or slightly exceed the transferred value, the isolated device 202B may therefore select these outputs to create the inputs of the transaction to the account associated with the other account. In such case the other device may be informed of the transferred value as well as the index of the outputs used to make the respective transaction, specifically the index of the first output 913. The other device may be further informed of the number of splits done to the first and last outputs, which are in the exemplary transaction related to the output 910_3 and the output 910_4.

As result, the output 910_3 may be completely used, while, the output 910_4 may be only partially used since while the outputs 910_4_1_1 and 910_4_1_2 are used the other outputs throughout its split levels 920_1 and 910_2 are unused.

The isolated device 202 may naturally use one or more of the unused outputs to create additional transactions to one or more other devices.

Moreover, the isolated device 202B may use partially used outputs such as, for example, the output 910_4 to create one or more additional transactions to the same other device to which the transaction was made that was created based on the output 910_4. Specifically, the isolated device 202B may use unused outputs of the partially used output starting by an unused output which immediately follows the last used output used to create a preceding transaction to the same other device. However, the isolated device 202B may use each partially used output only for transaction(s) to the same other device to which transactions were created based on the respective partially used output since this is the only other device which is aware (knows) of the split and the utilization of the split levels. The isolated device 202B may therefore not use partially used outputs to create transactions to other devices which are different from the other device for which the respective partially used output was used.

The single depository used by the isolated device 202B to create transactions of digital assets to multiple accounts associated with a plurality of other devices may be further combined with one or more of the previously described embodiments to support using outputs of transactions made from one or more of the other devices to the isolated device 202B. For example, the isolated device 202B may create another depository such as the depository 402 for each of one or more of the other devices which makes transactions of digital assets to the account associated with the isolated device 202B. In another example, the isolated device 202B may another depository such as the depository 802 for each of one or more pairs of the other devices which make transactions of digital assets to the account associated with the isolated device 202B.

According to some embodiments of the present invention, the isolated device 202, for example, the isolated device 202B may be configured to create single depository which may be used to create transactions to multiple accounts associated with a plurality of other devices. The plurality of other devices may include either network connected device such as for example, the computing nodes 204 and/or the access devices 206 as well as to other isolated devices 202 such as, for example, the isolated device 202A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms secure channel, blockchain protocols and cryptocurrency protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of updating received digital assets transactions in an isolated device, comprising:
   using at least one processor of an isolated device, wherein said isolated device having at least one limited capacity interface which is the only input interface of said isolated device and is selected from a group consisting of a keyboard, a touchscreen, and computer punched cards, thereby preventing network connectivity to said isolated device, for:
   receiving at least one limited length string via the at least one limited capacity interface of the isolated device, said at least one limited length string indicating a value of digital assets transferred in at least one transaction from at least one other device to an account associated with the isolated device, the at least one transaction is recorded in a blockchain maintained by a plurality of networked computing nodes with a respective identifier of the at least one transaction, which is computed based on at least one input value of digital assets included in the at least one transaction, wherein the at least one input value corresponds to a respective output value of at least one previous transaction stored in a predefined order in a depository allocated for the isolated device in the at least one other device, the isolated device is informed of each previous transaction stored in the depository;
   re-creating the respective identifier of the at least one transaction by inferring the respective identifier, by:
   identifying, based on the transferred value indicated by the at least one limited length string, and based on the predefined order, which of the at least one previous transaction was used to create the at least one transaction,
   determining, according to the identified at least one previous transaction, a content of the at least one transaction, and
   computing the respective identifier based on said determined content; and
   updating the isolated device with a balance of digital assets of the associated account according to the at least one transaction including the re-created respective identifier.

2. The method of claim 1, wherein the digital assets comprise cryptocurrency and the isolated device is a cryptocurrency wallet.

3. The method of claim 1, further comprising the at least one other device allocates a plurality of depositories each for a respective one of a plurality of isolated devices.

4. The method of claim 1, wherein the at least one other device is networked and aware of each transaction of digital assets on the blockchain network, the at least one other device is a member of a group consisting of: a network connected device and at least one of the plurality of networked computing nodes.

5. The method of claim 1, wherein the at least one other device is implemented by a subset of the plurality of networked computing nodes using at least one Multi-Party Computation (MPC) protocol to maintain the depository and carry out the transaction.

6. The method of claim 1, wherein the respective identifier is a hash value computed using at least one hash function.

7. The method of claim 1, further comprising the value transferred to the at least one other device in each of the at least one previous transaction is indexed in the output of the respective at least one previous transaction with a predefined index used by the isolated device to infer the respective identifier of the at least one transaction.

8. The method of claim 1, further comprising assigning a respective predefined value for each of at least one additional parameter potentially affecting the respective identifier computed for the at least one transaction.

9. The method of claim 1, wherein the isolated device is informed of each previous transaction stored in the depository via at least one limited length string received by the isolated device thus the isolated device is informed of the at least one previous transaction stored in the depository.

10. The method of claim 1, wherein each previous transaction stored in the depository relates to a respective transaction previously transferred from the isolated device to the at least one other device thus the isolated device is informed of the at least one previous transaction stored in the depository.

11. The method of claim 1, wherein the predefined order is based on a time of transfer of each previous transaction.

12. The method of claim 11, wherein the isolated device infers the respective identifier of the at least one transaction based on the transferred value and the at least one input of at least one most recent previous transaction which was most recently transferred from the isolated device to the at least one other device such that a cumulative value of digital assets transferred in the at least one most recent previous transaction is at least equal to the transferred value.

13. The method of claim 12, wherein, in case the cumulative value exceeds the transferred value, the at least one other device transfers an excess transaction to itself which comprises the difference between the cumulative value and the transferred value, the excess transaction is stored in the depository as the transaction most recently transferred from the isolated device to the at least one other device.

14. The method of claim 12, further comprising the at least one other device transfers a second value of digital assets from an account associated with the isolated device to at least one third device, the at least one other device transfers the second value from at least one least recent previous transaction which was least recently transferred from the isolated device to the at least one other device, a second cumulative value of digital assets transferred in the at least one least recent transaction is at least equal to the second value.

15. The method of claim 14, further comprising the at least one other device transfers the second value to the at least one third device via another depository allocated in the at least one other device for at least one third device.

16. The method of claim 15, further comprising, in case the value of the at least one output of the at least one least recent previous transaction is significantly larger than the second value, the at least one other device creates at least one hierarchical split level for the at least one least recent previous transaction, each hierarchical split level comprises a predefined number of artificial sub-transactions each having the identifier of the at least one least recent previous transaction and associated with a predefined sub-value such that a sum of the sub-value of all sub-transactions of a certain split level equals the value of a next higher hierarchy transaction, the at least one other device transfers at least part of the second value from at least one of the sub-transactions.

17. The method of claim 1, further comprising, in case a commission is allocated to at least one of the plurality of computing nodes for recording the at least one transaction, the isolated device is informed of a commission value to enable the isolated device to correctly identify the at least one previous transaction having a cumulative sum exceeding the transferred sum after the value of the commission is deducted from the cumulative sum.

18. The method of claim 17, wherein the commission value is predefined thus the isolated device is informed of the value of the commission.

19. An isolated device for storing digital assets, comprising:
a limited capacity interface that receives at least one limited length string entered by a user operating said at least one limited capacity interface, which is selected from a group consisting of a keyboard, a touchscreen, and computer punched cards, wherein said limited capacity interface is the only input interface of said isolated device;
a storage medium storing a code; and
at least one processor coupled to the limited capacity interface and to the storage medium, the at least one processor executes the code, the code comprising:
code instructions to receive at least one limited length string via said limited capacity interface, said at least one limited length string indicating a value of digital assets transferred in at least one transaction from at least one other device to an account associated with the isolated device, the at least one transaction is recorded in a blockchain maintained by a plurality of networked computing nodes with a respective identifier of the at least one transaction, which is computed based on at least one input value of digital assets included in the at least one transaction, wherein the at least one input value corresponds to a respective output value of at least one previous transaction stored in a predefined order in a depository allocated for the isolated device in the at least one other device, the isolated device is informed of each previous transaction stored in the depository,
code instructions to re-create the respective identifier of the at least one transaction by inferring the respective identifier, by:
identifying, based on the transferred value indicated by the at least one limited length string, and based on the predefined order, which of the at least one previous transaction was used to create the at least one transaction,
determining, according to the identified at least one previous transaction, a content of the at least one transaction, and
computing the respective identifier based on said determined content; and
code instructions to update the isolated device with a balance of digital assets of the associated account according to the at least one transaction including the re-created respective identifier.

* * * * *